US006963920B1

(12) United States Patent
Hohmann et al.

(10) Patent No.: US 6,963,920 B1
(45) Date of Patent: *Nov. 8, 2005

(54) INTELLECTUAL ASSET PROTOCOL FOR DEFINING DATA EXCHANGE RULES AND FORMATS FOR UNIVERSAL INTELLECTUAL ASSET DOCUMENTS, AND SYSTEMS, METHODS, AND COMPUTER PROGRAM PRODUCTS RELATED TO SAME

(75) Inventors: Luke Hohmann, Mountain View, CA (US); Irving S. Rappaport, Palo Alto, CA (US); Matthew Schnitz, Mountain View, CA (US); Brent Rosenquist, Mountain View, CA (US); Adam Jackson, Sunnyvale, CA (US)

(73) Assignee: Rose Blush Software LLC, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/545,608

(22) Filed: Apr. 7, 2000

Related U.S. Application Data

(63) Continuation-in-part of application No. 08/921,369, filed on Aug. 29, 1997, now Pat. No. 6,339,767, which is a continuation-in-part of application No. 08/867,392, filed on Jun. 2, 1997, now Pat. No. 5,991,751, application No. 09/545,608, which is a continuation-in-part of application No. 09/138,368, filed on Aug. 21, 1998, which is a continuation-in-part of application No. 08/921,369, application No. 09/545,608, which is a continuation-in-part of application No. 09/260,079, filed on Mar. 2, 1999, which is a continuation-in-part of application No. 09/138,368, application No. 09/545,608, which is a continuation-in-part of application No. 09/057,557, filed on Apr. 9, 1998, now Pat. No. 6,389,434, which is a continuation of application No. 08/632,801, filed on Apr. 17, 1996, now Pat. No. 5,806,079, which is a continuation-in-part of application No. 08/423,676, filed on Apr. 18, 1995, now Pat. No. 5,623,679, which is a continuation-in-part of application No. 08/341,129, filed on Nov. 18, 1994, which is a continuation-in-part of application No. 08/155,752, filed on Nov. 19, 1993, now Pat. No. 5,623,681.

(60) Provisional application No. 60/128,405, filed on Apr. 8, 1999.

(51) Int. Cl.[7] ............................................. G06F 15/16
(52) U.S. Cl. ........................ 709/230; 709/203; 709/217; 709/219
(58) Field of Search ................................ 709/203, 217, 709/219, 230; 707/100–104.1

(56) References Cited

U.S. PATENT DOCUMENTS 5,623,679 A * 4/1997 Rivette et al.

(Continued)

FOREIGN PATENT DOCUMENTS

WO    WO 98/16890    4/1998    ........... G06F/17/30

(Continued)

OTHER PUBLICATIONS

Barth et al., "XML, patent information and the Web," Proceedings of the 1998 International Chemical Information Conference, Proceedings of the 10th International Chemical Conference, Nimes, France, Oct. 18–21, 1998, pp. 92–111.

(Continued)

*Primary Examiner*—Rupal Dharia
*Assistant Examiner*—Quang Nguyen
(74) *Attorney, Agent, or Firm*—Sterne Kessler Goldstein & Fox PLLC

(57) ABSTRACT

An intellectual asset protocol for defining data exchange rules and formats for universal intellectual asset data objects, and systems, methods, and computer program products related to same. The system includes an intellectual asset protocol system that acts as an engine in the definition of data exchange rules and formats for universal intellectual asset documents. Also included is a front end system that preferably provides a graphical user interface to enable users to access the intellectual asset protocol system. In addition, an intellectual asset database is included that stores collections of intellectual asset objects (and information related to same), one or more embodiments of an intellectual asset protocol, and so forth. The intellectual asset protocol system interacts with an Intellectual Property Asset Manger (IPAM) server.

20 Claims, 45 Drawing Sheets

U.S. PATENT DOCUMENTS

| | | | | |
|---|---|---|---|---|
| 5,799,325 | A | | 8/1998 | Rivette et al. ............... 707/500 |
| 5,860,073 | A | | 1/1999 | Ferrel et al. ................. 707/522 |
| 5,953,528 | A | * | 9/1999 | Sullivan ...................... 707/100 |
| 6,343,297 | B1 | * | 1/2002 | D'Anjou et al. ......... 707/104.1 |
| 6,401,118 | B1 | * | 6/2002 | Thomas ...................... 709/203 |

FOREIGN PATENT DOCUMENTS

| | | | |
|---|---|---|---|
| WO | WO 98/34179 | 8/1998 | ........... G06F/17/30 |
| WO | WO 98/55945 | 12/1998 | ........... G06F/17/30 |

OTHER PUBLICATIONS

Brewin, Paul, "SGML and Patent Document Processing, Part I: WIPO Standard ST.32," World Patent Information, Elsevier Science Publishing, vol. 18, No. 4, pp. 183–192, Dec. 1996.

Brewin, Paul, "SGML and Patent Document Processing. Part II: Experience in the EPO," World Patent Information, Elsevier Sciences Publishing, vol. 19, No. 1, pp. 3–10, Mar. 1997.

Dudeck, Joachim, "Aspects of implementing and harmonizing healthcare communication standards," International Journal of Medical Informatics, Elsevier Scientific Publishers, vol. 48, No. 1–3, pp. 163–171, Feb. 1998.

Kristensen, Anders, "Template resolution in XML/HTML," Computer Networks and ISDN Systems, vol. 30, No. 1–7, pp. 239–249, Apr. 1998, North Holland Publishing.

Copy of International Search report issued Dec. 18, 2000 for PCT/US00/09427, 7 pages.

English Language Patent Abstract (JPO & Japio) for JP 06–231141, published Aug., 19, 1994, p. 1.

* cited by examiner

```
<!--
  APML version 0.1
  Author: Matt Schnitz

The goal of v0.1 to include text structure and all bibliographic tags
  present in the IPAM v6.0 database and indexes.
-->
<!--
  Definition of the Patent DOCTYPE tag.

The gross structure of an APML document:
  -Patent
    -Identity
    -Bibliography
    -Description et al
    -Claims Normalizations
  -GUID's always obey the Aurigin GUID convention
-->
<!ELEMENT Patent    (Bibliography,
                     Abstract,
              UnstructuredBibiliography?,
                BriefSummaryOfInvention?,
                   DescriptionOfDrawings?,
                   DescriptionOfInvention,
                          Claims)  >
<!ATTLIST Patent
        MajorVer ( 0 | 1 | 2 | 3 | 4 | 5 | 6
                 | 7 | 8 | 9 ) #REQUIRED
        MinorVer ( 0 | 1 | 2 | 3 | 4 | 5 | 6
                 | 7 | 8 | 9 ) #REQUIRED
        GUID ID #REQUIRED
<!--
  Normalized tags
  This DTD has a common set of tags that appear in many
  places. These "normalized tags" promise a given data
  normalization when they appear.

-Date's are always of the form YYYYMMDD.
  -PubOrg's are only allowed to be those found
     in WIPO Standard 3
  -Kind's obey the Aurigin Naming Convention
  -Num's are always purely numeric
  -Cntry's are only allowed to be
     ISO-specified countries
-->
```

```
<!ELEMENT Date    (#PCDATA)>  ⎫
<!ELEMENT PubOrg  (#PCDATA)>  ⎪
<!ELEMENT Kind    (#PCDATA)>  ⎬── 705
<!ELEMENT Num     (#PCDATA)>  ⎪
<!ELEMENT Cntry   (#PCDATA)>  ⎭

<!--
   Common tags and entities
   (i.e. tags that appear in more than one place but are not normalized)

TODO: What else should appear in the common text?
         Bold? Superscript?
-->
<!ENTITY %commontext "(#PCDATA)">  ⎫
<!ELEMENT P %commontext;>          ⎬── 706
<!ATTLIST P id ID #REQUIRED>       ⎭

<!--
   Bibliography tags

Despite the fact that it is inappropriate to arrange them like
   this in actual documents, I've arranged the bibliographic tags
   into areas in here for convenience.

-Identifiers
   -References to Other Documents
   -Legalities (i.e. data that reinforces the
     assignee's right to monopoly)
   -Classifications
   -Misc.
   They may have further decomposition.
-->
<!ELEMENT Bibliography (
    Title, PubNo, AppNo, PatentRef*, FilingDate, IssueDate?, PublicationDate?,
    CalculatedExpirationDate?, Assignee*, Inventor*,  ── 707
    Priority*, DesignatedStates, IPC*, USClassification*, PublicationLanguage, NumClaims?, NumDrawingPages?,
    NumFigures?, NumSpecPages?
)>
```

FIG.7B

```
<!--
    Bibliography: Identifiers
    -AppNo is currently unnormalized, and with good
     reason. There are hundreds of different
     application number formats.
-->
<!--
    This "xml:space" thing is a trick to make
    the XML parser preserve the whitespace of the tag.
-->
<!ELEMENT Title %commontext;>
<!ATTLIST Title xml:space (preserve|default) "preserve">             } — 708

<!ELEMENT PubNo (PubOrg, Kind, Num)>
<!ELEMENT AppNo (#PCDATA)>

<!--
    Bibliography: References to other documents

The patent ref is expected to contain a GUID that               } — 709
    obeys the same convention as Patent's GUID attribute
-->
<!ELEMENT PatentRef (#PCDATA)>

<!--
    Bibliography: Legalities
-->
<!ELEMENT FilingDate               (Date)>
<!ELEMENT IssueDate                (Date)>
<!ELEMENT PublicationDate          (Date)>
<!ELEMENT CalculatedExpirationDate (Date)>
<!--
    -Inventor should be Last Name, First Name if you can           } — 710
     arrange it <!ELEMENT Assignee (#PCDATA)>
<!ELEMENT Inventor (#PCDATA)>
<!--

-->
<!ELEMENT Priority (Date, AppNo, PubOrg)>
<!ELEMENT DesignatedStates           (Cntry+)>
```

FIG.7C

```
<!--
    Bibliography: Classifications
-->
<!--
    IPC

Edition number and primary/secondary assumed by processing software if
not supplied. Suggested meanings: edition 6 by default, first IPC listed
is the primary IPC.
-->
<!ELEMENT IPC (Section, Class, Subclass, Group, Subgroup)>
<!ATTLIST IPC edition NMTOKEN #IMPLIED
              primary (Y|N) #IMPLIED>
<!ELEMENT Section     (#PCDATA)>
<!ELEMENT Class       (Num)>
<!ELEMENT Subclass    (#PCDATA)>
<!ELEMENT Group       (#PCDATA)>
<!ELEMENT Subgroup    (#PCDATA)>
<!--
    US Classification The "class" of US Class being used is assumed if not
    supplied. Suggested meaning: Original by default.

-->
<!ELEMENT USClassification (USClass, USSubclass, USSuffix)>
<!ATTLIST USClassification
          class(Original|Xref|Unofficial|Digest) #IMPLIED>
<!ELEMENT USClass     (#PCDATA)>
<!ELEMENT USSubclass  (#PCDATA)>
<!ELEMENT USSuffix    (#PCDATA)>
```
⎫
⎬ 711
⎭

```
<!--
    Bibliography: Misc.

-xml:lang must, of course, conform to the XML standard.

-->
<!ELEMENT PublicationLanguage (#PCDATA)>
<!ATTLIST PublicationLanguage xml:lang NMTOKEN #REQUIRED>
<!ELEMENT NumClaims        (Num)>
<!ELEMENT NumDrawingPages  (Num)>
<!ELEMENT NumFigures       (Num)>
<!ELEMENT NumSpecPages     (Num)>
```
⎫
⎬ 712
⎭

FIG. 7D

```
<!--
   Abstract
-->
<!ELEMENT Abstract (P*)>
<!ATTLIST Abstract xml:space (preserve|default) "preserve">
```
} 713

```
<!--
   Unstructured Bibliograpy

Necessary for a variety of reasons, most notably:
   -Prevents us from structuring all the ugly bib
    data in US Green Book.
   -We need it if we want XML2EQV and don't have
    all the bib data necessary to "render" the front page information
-->
<!ELEMENT UnstructuredBibliography (#PCDATA)>
<!ATTLIST UnstructuredBibliography
        xml:space (preserve|default) "preserve"
        xml:lang NMTOKEN #REQUIRED>
```
} 714

```
<!--
   Brief Summary of the Invention
-->
<!ELEMENT BriefSummaryOfInvention (P*)>
<!ATTLIST BriefSummaryOfInvention
        xml:space (preserve|default) "preserve"
        xml:lang   NMTOKEN #REQUIRED>
```
} 715

```
<!--
   Brief Description of the Drawings
-->
<!ELEMENT DescriptionOfDrawings (P*)>
<!ATTLIST DescriptionOfDrawings
        xml:space (preserve|default) "preserve"
        xml:lang   NMTOKEN #REQUIRED>
```
} 716

```
<!--
   Detailed Description of the Invention

-->
<!ELEMENT DescriptionOfInvention (P*)>
<!ATTLIST DescriptionOfInvention
        xml:space (preserve|default) "preserve"
        xml:lang   NMTOKEN #REQUIRED>
```
} 717

```
<!--
   Claims
-->
<!ELEMENT Claims (Claim|P)*>
<!ATTLIST Claims xml:space (preserve|default) "preserve"
                 xml:lang   NMTOKEN #REQUIRED>
<!ELEMENT Claim %commontext;>
<!ATTLIST Claim id ID #REQUIRED>
```
} 718

FIG. 7E

```
<?xml version="1.0"?>
<!DOCTYPE Patent SYSTEM "APML_v0.1.DTD">

<Patent MajorVer="0" MinorVer="1" GUID="BP00UUUS3653663">

<Bibliography>
        <Title xml:space="preserve">SPHERICAL SHELL GAME APPARATUS HAVING
INTERNAL CUPS AND A FREELY MOVEABLE BALL</Title>
        <PubNo>
            <PubOrg>US</PubOrg>
            <Kind>UU</Kind>
            <Num>3653663</Num>
        </PubNo>
        <AppNo>846329</AppNo>

<PatentRef>BP00UUUS2100898</PatentRef>

<FilingDate>
            <Date>19690731</Date>
        </FilingDate>
        <IssueDate>
            <Date>19720404</Date>
        </IssueDate>
        <CalculatedExpirationDate>
        <Date>19990404</Date>
        <CalculatedExpirationDate>

<Assignee>Said Kinberg, by said Mayer</Assignee>
        <Inventor>Kinberg, Benjamin</Inventor>
        <Inventor>Mayer, Richard J.</Inventor>

<DesignatedStates>
            <Cntry>US</Cntry>
        </DesignatedStates>

<IPC>
            <Section>A</Section>
            <Class>
                <Num>63</Num>
            </Class>
            <Subclass>f</Subclass>
            <Group>906</Group>
            <Subgroup></Subgroup>
        </IPC>
```

FIG. 8A

```xml
        </IPC>
        <USClassification class="Original">
            <USClass>273</USClass>
            <USSubclass>96</USSubclass>
            <USSuffix>R</USSuffix>
        </USClassification>
        <USClassification class="Xref">
            <USClass>273</USClass>
            <USSubclass>115</USSubclass>
            <USSuffix></USSuffix>
        </USClassification>
        <USClassification class="Xref">
            <USClass>273</USClass>
            <USSubclass>95</USSubclass>
            <USSuffix>R</USSuffix>
        </USClassification>

<PublicationLanguage xml:lang="en"/>
        <NumClaims>
            <Num>8</Num>
        </NumClaims>
        <NumDrawingPages>
            <Num>1</Num>
        </NumDrawingPages>
        <NumFigures>
            <Num>2</Num>
        </NumFigures>
    </Bibliography>

<Abstract xml:space="preserve">
<P id="P0">A game including a hollow transparent spherical shell having a loose ball confined therein and a plurality of consecutively numbered cups within the shell. The object of the game is to transfer the ball from one cup to another in consecutively numbered order.</P>
    </Abstract>

<UnstructuredBibliography xml:space="preserve" xml:lang="en">United
States Patent      [19]
Kinberg et al.
[11]   Patent Number:    3,653,663
[45]   Date of Patent:   Apr. 4, 1972
------------------------------------------
```

FIG. 8B

[54] SPHERICAL SHELL GAME APPARATUS HAVING INTERNAL CUPS AND A FREELY MOVEABLE BALL

[75] Inventors: Benjamin Kinberg, 425 Riverside Drive, New York, NY, 10025; Richard J. Moyer, Bloomfield, NJ

[73] Assignee:

[21] Appl. No.: 846,329

[22] Filed: Jul. 31, 1969

Related U.S. Application Data

[51] Int. Cl................A63f 9/06

[52] U.S. Cl.........273/96.R; 273/115; 273/95.R

[58] Field of Search.......273/95, 96, 113, 115

[56] References Cited

U.S. PATENT DOCUMENTS
2,100,898  11/1937  Bernett..............273/95

OTHER PUBLICATIONS
Playthings January, 1969 P.61

Primary Examiner-- Richard C. Pinkham
Assistant Examiner-- Marvin Siskind
Attorney, Agent, or Firm-- Charles J. Worth

[57] ABSTRACT

A game including a hollow transparent spherical shell having a loose ball confined therein and a plurality of consecutively numbered cups within the shell. The object of the game is to transfer the ball from one cup to another in consecutively numbered order.

8 Claims, 1 Drawing Sheet
</UnstructuredBibliography>

FIG.8C

```xml
<BriefSummaryOfInvention xml:space="preserve" xml:lang="en">
<P id="P1"><?format centered?>FIELD OF THE INVENTION</P>
<P id="P2">The present invention relates to games, and more particularly
to a game of skill.</P>
<P id="P3"><?format centered?>SUMMARY OF THE INVENTION</P>
<P id="P4">An object of the present invention is to provide a game which
requires a high degree of skill.</P>
<P id="P5">Another object is to provide such a game which is amusing to
children and adults.</P>
<P id="P6">Another object is to provide such a game which is attractive
in appearance.</P>
<P id="P7">Another object is to provide such a game which is sturdy in
construction.</P>
<P id="P8">A further object is to provide such a game which can be
fabricated in a simple and economical manner.</P>
<P id="P9">Other and further objects of the invention will be obvious
upon an understanding of the illustrative embodiment about to be
described, or will be indicated in the appended claims, and various
advantages not referred to herein will occur to one skilled in the art
upon employment of the invention in practice.</P>
<P id="P10">In accordance with the present invention, the foregoing
objects are generally accomplished by providing a game which comprises a
hollow transparent spherical shell, a loose ball confined with the shell,
and a plurality of spaced cups secured to the inner wall of the shell,
one of the cups having a side opening for admitting the ball at the
starting point.</P>
   </BriefSummaryOfInvention>

<DescriptionOfDrawings xml:space="preserve" xml:lang="en">
<P id="P11"><?format centered?>BRIEF DESCRIPTION OF THE DRAWING</P>
<P id="P12">FIG.1 is an elevational view of the shell looking
horizontally at the outer end of the cup provided with the side
opening.</P>
<P id="P13">FIG.2 is a sectional view of one of the other cups taken
along the line 2-2 on FIG.1.</P>
   </DescriptionOfDrawings>

<DescriptionOfInvention xml:space="preserve" xml:lang="en">
<P id="P14"><?format centered?>DESCRIPTION OF THE PREFERRED
EMBODIMENT</P>
<P id="P15">Referring now to the drawing in detail, there is shown a game
in accordance with the present invention which generally comprises a
hollow transparent spherical shell 10, a loose ball 11 confined within
the shell, and a plurality of cups secured to the inner wall of the
shell.</P>
```

FIG.8D

\<P id="P16"\>For example, eight cups 12 are provided which are identified by numerals 1 thru 8 which are arranged in consecutive order. Consecutive letters of the alphabet could be employed instead of numerals. Preferably, the numerals are on the shell 10 at the base of the cups 12 although they could be on the cups. As shown in FIG.2, the cups are flared towards the center of the shell and are frusto-conical in shape. The cups are open at the outer end thereof and the inner wall of the shell provides a closure for these openings.\</P\>

\<P id="P17"\>The shell 10 is formed of two hemi-spherical sections and four cups 12 are adhesively or otherwise secured to each shell section. Thereafter, the ball 11 is deposited in one of the shell sections and shell sections are secured to each other.\</P\>

\<P id="P18"\>The cup identified by the numeral 1, which is the starting point of the game, has a side opening 14 for admitting the ball 11 by rolling the ball from the inner wall of the shell 10 through this opening.\</P\>

\<P id="P19"\>The shell 10 has indicia thereon such as V-shaped marks or arrows 15 for indicating the direction from one cup to the following numbered cup, that is, from cup 1 to cup 2, from cup 2 to cup 3, and so forth.\</P\>

\<P id="P20"\>The cups 2 may be spaced evenly, but preferably are spaced unevenly to make the game more difficult to be played. For example, as shown, the distance between cups 2 and 3 is greater than the distance between cups 1 and 2.\</P\>

\<P id="P21"\>The game is played by rolling the ball 11 into cup 1 and then attempting to transfer the ball to cup 2 by tilting the shell in the proper angle and at the proper momentum. The player then attempts to transfer the ball from cup 2 to cup 3 and so on. If a cup is missed, the ball must be returned to cup 1 and the game must be restarted. This makes the game frustrating and requires a high degree of skill to play the same from cup 1 to cup 8 without a miss. When the game is played by more than one person and the first person misses, then the next person has a chance. This is continued until one person completes the game without a miss.\<\P\>

\<P id="P22"\>\<?format centered?\>SUMMATION\</P\>

\<P id="P23"\>From the foregoing description, it will be seen that the present invention provides an interesting, fascinating and frustrating game which can be played by one or more persons.\</P\>

\</DescriptionOfInvention\>

FIG.8E

```xml
<Claims xml:space="preserve" xml:lang="en">
    <P id="P24">We claim:</P>
    <Claim id = "C1">A game comprising a hollow transparent spherical shell, a loose ball confined within said shell, and a plurality of spaced apart cups having their bases secured to the inner wall of said shell so that the ball may be consecutively transferred from cup to cup by gravity, each transfer being effected by imparting a tilting motion to said shell, one of said cups having an opening in its side for admitting said ball.</Claim>
    <Claim id = "C2">A game according to claim 1, wherein said cups are mounted directly to the inner wall of said shell.</Claim>
    <Claim id = "C3">A game according to claim 2, wherein said cups are flared outwardly towards the center of said shell.</Claim>
    <Claim id = "C4">A game according to claim 2, wherein said cups are spaced unevenly.</Claim>
    <Claim id = "C5">A game according to claim 2, wherein said cups are identified by numerals arranged adjacently in consecutive order.</Claim>
    <Claim id = "C6">A game according to claim 5, wherein said numerals are on said shell at the base end of said cups.</Claims>
    <Claim id = "C7">A game according to claim 5, wherein said shell has indicia for indicating the direction from one cup to the following numbered cup.</Claim>
    <Claim id = "C8">A game according to claim 5, wherein the cup identified by the lowest numeral is said cup having said side opening.</Claim>
</Claims>

</Patent>
```

FIG.8F

```xml
<?xml version="1.0"?>
<!DOCTYPE Patent SYSTEM "APML_v0.1.DTD">
<Patent MajorVer="0" MinorVer="1" GUID="BP00A2EP799999">

<Bibliography>
        <Title xml:space="preserve">A rotor for turbomolecular pump</Title>
        <PubNo>
            <PubOrg>EP</PubOrg>
            <Kind>A2</Kind>
            <Num>799999</Num>
        </PubNo>
        <AppNo>96202468.3</AppNo>

<FilingDate>
            <Date>19960905</Date>
        </FilingDate>
        <PublicationDate>
            <Date>19971008</Date>
        </PublicationDate>
        <CalculatedExpirationDate>
            <Date>20160905</Date>
        </CalculatedExpirationDate>

<Inventor>Cerruti, Roberto</Inventor>

<Priority>
            <Date>19960405</Date>
            <AppNo>TO960265</AppNo>
            <PubOrg>IT</PubOrg>
        </Priority>
        <DesignatedStates>
            <Cntry>DE</Cntry>
            <Cntry>FR</Cntry>
            <Cntry>GB</Cntry>
        </DesignatedStates>

<IPC edition = "6" primary = "Y">
            <Section>F</Section>
            <Class>
                <Num>4</Num>
            </Class>
            <Subclass>D</Subclass>
            <Group>29</Group>
            <Subgroup>02</Subgroup>
        </IPC>
```

FIG. 9A

```
<IPC edition = "6">
    <Section>F</Section>
    <Class>
        <Num>4</Num>
    </Class>
    <Subclass>D</Subclass>
    <Group>19</Group>
    <Subgroup>04</Subgroup>
</IPC>

<PublicationLanguage xml:lang="en"/>
<NumClaims>
    <Num>8</Num>
</NumClaims>
</Bibliography>

<Abstract xml:space="preserve">
<P id="P0">The present invention relates to a rotor (1) of a vacuum pump
comprising a rotatable shaft (5) and a plurality of spaced apart parallel
rotor disks (2, 3) secured to said rotatable shaft (5), such rotor being
provided with a corrosion-resistant protective coating formed by a layer
of polymeric material.</P>
</Abstract>

<UnstructuredBibliography xml:space="preserve" xml:lang="en">[19]
Publishing Organization EP
```

[11] Publication Number
799999

[12] Kind
A2

[21] Application Number
96 96202468

[51] Intl. Cl.6
F04D 29/02 A
F04D 19/04 B

[22] Date of Filing
05.09.96

[30] Priority
05.04.96 IT 96TO 265

FIG.9B

[43] Date of publication of application
08.10.97

[84] Designated Contracting States
DE FR GB

[71] Applicant(s)
VARIAN S.P.A.

[72] Inventor(s)
CERRUTI, ROBERTO

[54] Title
A ROTOR FOR TURBOMOLECULAR PUMP

[56] Abstract
The present invention relates to a rotor (1) of a vacuum pump comprising a rotatable shaft (5) and a plurality of spaced apart parallel rotor disks (2,3) secured to said rotatable shaft (5), such rotor being provided with a corrosion-resistant protective coating formed by a layer of polymeric material.
</UnstructuredBibliography>

<DescriptionOfInvention xml:space="preserve" xml:lang="en">
<P id="P1">The present invention is concerned with the rotor of a vacuum pump.</P>
<P id="P2">More particularly the invention refers to a rotor for those vacuum pumps known as turbomolecular pumps that are to be employed in the presence of particularly corrosive gases.</P>
<P id="P3">As it is well known, a turbomolecular pump can schematically be regarded as comprising an outer casing in which a number of gas pumping stages are housed.</P>
<P id="P4">The gas pumping stages are generally obtained through an assembly of stator rings cooperating with rotor disks that are secured to a rotatable shaft driven by the pump motor.</P>
<P id="P5">The pumping stages comprise a space for allowing the gas flow, named pumping channel, where the surfaces of the rotor disk and the facing stator are relatively spaced away, and tight zones where the surfaces of the rotor disk and the facing stator are very near to each other.</P>
<P id="P6">The rotor disks can be either flat (plane) disks or disks that are provided with closely spaced apart inclined blades. </P>

FIG.9C

<P id="P7">A vacuum pump of the turbomolecular type comprises both
flat disks and bladed disks, and is capable to achive low
pressure levels in the order of 10<! - - Esc(<SP>) - ->- 8<! - - Esc(</SP>) - -> Pa.</P>
<P id="P8">In order to reach the above vacuum levels with the presently
used pumps, the rotor must rotate at a speed near to 100,00 rpm. </P>
<P id="P9">It has been known to use turbomolecular pumps in the field of
integrated circuits (ICs) manufacturing.</P>
<P id="P10">In the manufacturing cycle of integrated circuits there are
used gas mixtures such as HC1, HBr, CL<! - - Esc(<SB>) - - 2<! - - Esc(</SB>)
- ->, F1<! - - Esc(<SB>) - ->2<! - - Esc(</SB>) - ->, NH<! - - Esc(<SB>) - ->3 <! Esc(</SB>) - -> , etc.
that are well-known highly corrosive gases.</P>
<P id="P11">One of the main problem when using turbomolecular pumps in
the ICs manufacturing industry is due to the accumulation of a not
negligible amount of gas because of the diffusion through the pumping
stages.</P>
<P id="P12">As a consequence, the surfaces of the internal components of
the pump, particularly the rotor surface, come into direct contact with
such gas mixtures and are subjected to the corrosive action thereof.</P>
<P id="P13">There are also known rotors for turbomolecular pumps provided
with a metal or ceramic coating as a protection against the action of
such corrosive gases.</P>
<P id="P14">The known protective metal coating is generally applied to
the rotor by means of nickel plating, zinc plating or anodizing
processes.</P>
<P id="P15">As already mentioned the rotor of a turbomolecular pump is
rotated at very high speeds, usually not lower than 25,000 rpm. </P>
<P id="P16">Due to the very high rotation speed of the rotor and to the
extremely reduced gap between the pump rotor and the stator in the
pumping stages, a mass distribution in the rotor body that is not
homogeneous with respect to its axis of rotation can cause a force
unbalance such as to jeopardize the working of the pump up to a failure
of its components.</P>
<P id="P17">Thus an essential requirement in manufacturing a
turbomolecular pump, particularly to be used with corrosive gases, is to
achieve a substantially perfect rotational balancement of the rotor
body.</P>
<P id="P18">The known metal or ceramic coatings used until now have the
drawback of being unsuitable for application onto objects that are to
remain perfectly balanced while maintaining very smooth surfaces such as
the rotor of a turbomolecular pump. Namely, due to the complex
geometrical shape and the small size of the areas in which the blades are
attached to the rotor the thickness of the metal or ceramic coating can
result as not adequate and easy to be corroded away.</P>

FIG.9D

\<P id="P19"\>In order to prevent this from happening it is often increased the amount of the protective material deposited onto the rotor body, but this countermeasure can lead to a not uniform thickness of the protection coating of the flat surfaces of the rotor disks that sometimes results in being too thick.\</P\>
\<P id="P20"\>Consequently an additional finishing step becomes necessary in order to level the surfaces on which the deposited material has a not uniform thickness.\</P\>
\<P id="P21"\>The object of the present invention is to overcome the above mentioned drawbacks by realizing a rotor for a vacuum pump that is corrosion resistant while at the same time has an easy and inexpensive construction.\</P\>
\<P id="P22"\>The above objects of the present invention are accomplished by a rotor as claimed in claim 1.\</P\>
\<P id="P23"\>Additional objects of the invention are achieved by a rotor as claimed in the dependent claims.\</P\>
\<P id="P24"\>Further characteristics and advantages of the present invention will become evident from the description of some preferred but not exclusive embodiments thereof that are illustrated – only by way of example in the attached drawings, in which:\</P\>
\<!--Esc(\<SL COMPACT=COMPACT\>
\<LI\>Figure 1 is a perspective partial view of a rotor of a turbomolecular pump; and
\<LI\>Figure 2 is an enlarged cross-section view of a detail of the rotor according to the invention.
\</SL\>)--\>
\<P id="P25"\>With reference to Figure 1, a rotor 1 of a turbomolecular pump comprises a plurality of flat rotor disks 2 and a plurality of rotor disks 3 provided with projecting inclined blades 4.\</P\>
\<P id="P26"\>The rotors 2 and 3 are secured to a rotatable shaft 5 driven into rotation by a pump motor (not shown)\</P\>
\<P id="P27"\>Referring also to the enlarged-cross section view of Fig.2, the surface of the rotor according to the invention is covered with a polymeric protective layer of film 6 that is uniformely distributed over the whole rotor surface. The polymer is preferably a straight-chain organic compound having a molecular weight higher than 10,000 and is electrically insulating.\</P\>
\<P id="P28"\>In the embodiment shown in Fig.2, the thickness of the protective layer 6 is shown much larger than the real size for a better appreciation.\</P\>
\<P id="P29"\>The coating layer 6 is preferably obtained by polymerization of a reactive monomer over the rotopr surface, under vacuum conditions.\</P\>

FIG.9E

<P id="P30">In a preferred embodiment of the invention the thickness fo the protective layer 6 is comprised between 12 and 20 μm, with a tolerance of about ±2 μm, so that the thickness ranges between about 10 and 22 μm.</P>
<P id="P31">A preferred polymeric material for the layer 6 is a so-called poly-(p-xylylene), that is a polymer of (p-xylylene). In this case the coating process comprises a vaporization of a dimmer of (p-xylylene) under vacuum, preferably under a pressure of 100 Pa at a temperature of aout 150°C.</P>
<P id="P32">Then the vapor is passed through a pyrolysis zone at a temperature of about 680°C and a pressure of 50 Pa thus forming the monomer of (p-xylylene).</P>
<P id="P33">The monomer is then admitted into a coating chamber under a lower pressure, containing the rotor body that is kept rotating for a better distribution of the coating. The rotor is substantially at room temperature, i.e. is "cold" in respect of the monomer and this temperature difference causes a condensation with substantially simultaneous polymerization of the reactive monomer onto the rotor surface.</P>
<P id="P34">A suitable dimmer of (p-xylylene) is available from Ausimont under the trade name GALAXYL, or from Union Caride under the trade name PARYLENE.</P>
<P id="P35">From laboratory comparative tests carried out by the applicant it has been discovered that the resistance to corrosion of a rotor treated according to the invention is much higher than that of rotors protected by conventional ceramic or metal layers.</P>
<P id="P36">It is deemed that the superior resistance to corrosion of the rotor according to the invention derives from both the corrosion resistant properties of the polymer coating, together with the high uniformity of the deposited layer which extends also over sharp edges or recessed areas, particularly at the junction of the rotor blades.</P>
<P id="P37">It is evident that the polymeric coating according to the invention can be also applied to other (stationary) components of a turbomolecular pump that are exposed to corrosion, such as the stator rings, the spacing rings located between the stators, the pump body and its inner surface.</P>
    </DescriptionOfInvention>

FIG.9F

```xml
<Claims xml:space="preserve" xml:lang="en">
    <Claim id = "C1">A rotor (1) for a vacuum pump (1) comprising a rotatable shaft (5) and a plurality of rotor disks (2,3), parallel and spaced apart from each other, and secured to said rotatable shaft (5), characterized in that the whole surface of said rotor is covered by a corrosion-resistant protective coating formed by a polymeric material layer having a uniform thickness comprised between 10 and 22 m.</Claim>
    <Claim id = "C2">A rotor as claimed in claim 1, characterized in that said protective coating is formed by a straight-chain organic compound, electrically insulating and having a molecular weight higher than 10,000.</Claim>
    <Claim id = "C3">A rotor as claimed in claim 1 or 2, characterized in that said protective coating is formed through a polymerization under vacuum of a reactive monomer onto the rotor surface.</Claim>
    <Claim id = "C4">A rotor as claimed in any preceding claim, characterized in that said protective coating is resistant to the corrosive action of gases used in the manufacturing of integrated circuits, particularly those of the group formed by HCl, HBr, CL<!--Esc(<SB>)-->2<!--Esc(</SB>)-->, Fl<!--Esc(<SB>)-->2<!--Esc(</SB>)-->, NH<!--Esc(<SB>)-->3<!--Esc(</SB>)--> and mixture thereof.</Claim>
    <Claim id = "C5">A rotor as claimed in any preceding claim, characterized in that said polymeric material is poly-(p-xylene).</Claim>
    <Claim id = "C6">A turbomolecular pump comprising a rotor (1) as claimed in claims 1 to 5.</Claim>
    <Claim id = "C7">A turbomolecular pump as claimed in claim 6 characterized in that at least one other staionary component of the said pump is provided with a corrosion resistant protective layer comprising a polymer.</Claim>
    <Claim id = "C8">A turbomolecular pump as claimed in claim 6, characterized in that said polymer is poly-(p-xylylene).</Claim>
</Claims>

</Patent>
```

FIG.9G

| FROM US REDBOOK 1004 | GREENBOOK 1006 | EPO/PCT EPD/DAB 1008 | ERS/SAB 1010 |
|---|---|---|---|
| <B100> | N/A | | |
| <B190> | HARDCODED | | <B190> |
| <B130> | WKU,PBL | | <B130> |
| <B110> | WKU | | <B110> |
| <SDOBI> | PATN et al | | <SDOBI> |
| <B140> | ISD | | <B140> |
| <B210>,<B211US> | SRC,APN,APT | | <B210> |
| <B220> | APD | | <B220> |
| HARDCODED | HARDCODED | | <SDOBI>,<B260> |
| N/A | N/A | | <B004EP> |
| <B221US/>,<B222US/> | APT,PBL,TRM | | <B010EP>,<B078EP> |
| <B473>,<B473US/> | N/A | | <B235>-<B246> |
| <B474>,<B474US> | N/A | | |
| N/A | N/A | | <B001EP>,<B840> |
| (HARDCODED?) | (HARDCODED?) | | |
| <B300> | PRIR | | |
| <B310> | APD | | |
| <B320> | APN | | |
| <B330) | CNT | | |
| <B510>,<B516> | EDF | | |
| <B511>,<B512> | ICL | | |
| <B511>,<B512> | ICL | | |
| <B511>,<B512> | ICL | | |
| <B511>,<B512> | ICL | | |
| <B511>,<B512> | ICL | | |
| <B520> | CLAS,XCL,UCL,DCL | | |
| <B521>,<B522> | OCL | | |
| <B521>,<B522> | OCL | | |
| <B521>,<B522> | OCL | | |
| <B540> | TTL | | |
| N/A | N/A | | |
| N/A | UREF,FREF | | |
| <B561> | PNO | | |
| <B561> | HARDCODED/CNT | | |
| <B561> | PNO | | |
| <B561> | PNO | | |
| <B561> | ISD | | |
| <B561> | NAM | | |
| <B561> | OCL,XCL,UREF | | |
| | PARN | | |
| <B562> | OREF | | |
| <B600>'s | REIS et. al. | | |
| N/A | RLAP et. al. | | |
| N/A | N/A | | |
| N/A | N/A | | |

| | |
|---|---|
| <B578US> | NCL |
| <B595> | NDR |
| <B595US> | |
| <B596> | NFG |
| | NPS |
| N/A | INVT |
| | |
| <B721US> | NAM |
| <B721US> | NAM |
| <B721US> | NAM |
| <B721US> | NAM |
| <B721US> | STR |
| <B721US> | STR |
| <B721US> | STR |
| <B721US> | CTY |
| <B721US> | STA |
| <B721US> | CNT |
| <B721US> | ZIP |
| <B721US> | |
| <B721US> | |
| <B721US> | |
| | R47 |
| <B721US> | |
| <B721US> | |
| <B721US> | |
| <B721US> | ITX |
| <B732US> | ASSG, COD |
| <B731> | NAM |
| <B731> | NAM |
| <B731> | NAM |
| <B731> | NAM |
| <B731> | CTY |
| <B731> | STA |
| <B731> | CNT |
| | ZIP |
| <B731> | ITX |
| N/A | EXP |
| <B746> | |
| <B746> | |
| N/A | EXA |
| <B747> | |
| <B747> | |
| <B748US> | ART |
| N/A | PCTA |
| <B871> | PCP |
| <B871> | PCD |
| <B861> | PCN |
| <B861> | PD3 |
| N/A | N/A |
| <B863> | PD1 |
| <B864> | PD2 |

<B003EP>

| | | |
|---|---|---|
| <SDOAB> | ABST | |
| <SDODE> | N/A | |
| <RELAPP> | PARN | |
| <GOVINT> | GOVT | |
| <BRFSUM> | BSUM | |
| <DRWDESC> | DRWD | |
| <DETDESC> | DETD | |
| <B577>, <CLM> | CLMS, DCLM STM, ECL, NUM, " " | |
| | N/A | |
| <B580> | | |
| <B582> | FSC, FSS | |
| <B583> | | |
| <B581> | | |
| <SDODR> | | |
| <SDOCR> | | |
| N/A | N/A | |
| | APPENDIX A,##SPCn## | |
| TIFF | N/A | |
| Mathmatica, MathML, TIFF | ##EQUn## | |
| ChemDraw, MOL, TIFF | ##STRn## | |
| CALS, TABLEPAK | ##TBLn## | |
| APPENDIX G | APPENDIX C | |
| WIPO St 25 | | |
| APPENDIX G, ISO's | APPENDIX C | |
| APPENDIX H | | |
| APPENDIX H | | <BCHG>,ETC |
| APPENDIX H | | |

IPD
HEADER
HEADER 6-9, 010
HEADER, 020, 021
HEADER, SORT1, 030
////////////////////
N/A
HEADER, 060
40, 900
50
132
151

081, 082
N/A
100, 901?
90
80
70

071-NOT EXACTLY 130,132,954?,994?
N/A
N/A 31,302?
303?,306?
310,311?,312?
N/A

| INTERMEDIATE XML <Patdoc> 1014 | 1016 | TYPE 1018 | TO DB SCHEMA 1020 |
|---|---|---|---|
| <identity> | | NAMING CONVENTION | DOCUMENT guid et al |
| <PubOrg> | | WIPO ST 3 | IP_DOC pub_org |
| <Kind> | | WIPO ST 16 | IP_DOC ip_doc_kind |
| <Num> | | INT | IP_DOC doc_number |
| <Bibliography> | | N/A | IP_DOCUMENT et al |
| <PubDate> | | DATE | IP_DOC pub_date |
| <AppNo> | | VARCHAR | PTO_PAT AppNo? |
| FilingDate> | | DATE | IP_DOC filing_date |
| <PublicationLanguage> | | ISO STANDARD? | |
| <LegalStatus> | | N/A | IP_DOC cal_exp_date |
| ??? | | ??? | |
| ??? | | ??? | |
| ??? | | ??? | |
| ??? | | ??? | |
| <DesignatedState>(requ | | CHAR(2) | EPO_DS,PCT_DS |
| <Priority> | | N/A | DOC_PRIORITY, Priority |
| <AppNo> | | VARCHAR | DOC_PRIOR app_no |
| <Date> | | DATE | DOC_PRIOR date |
| <PubOrg> | | WIPO ST 3 | DOC_PRIOR pub_org |
| <IPC> | | WIPO ST (I FORGET) | IPC |
| <Section> | | CHAR(1) | IPC section |
| <Class> | | INT | IPC class |
| <Subclass> | | CHAR(1) | IPC subclass |
| <Group> | | CHAR(3) | IPC classGroup |
| <Subgroup> | | CHAR(7) | IPC subgroup |
| <USClass> | | N/A | PATENT_CLASS_XREF |
| <Class> | | CHAR(3) | CLASSXREF patent_class |
| <Subclass> | | CHAR(3) | CLASSXREF subclass |
| <Suffix>? | | CHAR(3) | CLASSXREF suffix |
| <Title> | | VARCHAR | IP_DOC title |
| <Citations> | | N/A | IP_IP_XREF |
| <PatDocRef> | | N/A | IP_IP_XREF |
| <Normalized>? | | NAMING CONVENTION | IP_IP_XREF referenced |
| <PubOrg> | | WIPO ST 3 | |
| <Kind> | | WIPO ST 16 | |
| <Num> | | INT | |
| <IssueDate>? | | DATE | |
| <Surname>? | | VARCHAR | |
| <USClass>* | | SEE ABOVE | |
| <IPO>? | | SEE ABOVE | |
| <TextExplanation> | | TEXT | |
| <OtherCitation> | | VARCHAR | |
| <RelatedDocs> | | N/A | RelatedApp |
| ??? | | N/A | |
| ??? | | N/A | |
| ??? | | N/A | |

FIG.10G

| | | | |
|---|---|---|---|
| <NumClaims>? | | INT | PTO_PATENT numClaims |
| <NumDrawingPages>? | | INT | PTO numDrawingPages |
| <NumColorDrawingPages>? | | INT | |
| <NumDrawingFigs>? | | INT | PTO numFigures |
| <NumSpecPages>? | | INT | PTO numSpecs |
| <Inventor> | | N/A | DOC_INVENTOR |
| <INPADOC> | | VARCHAR | |
| <Title>? | | VARCHAR | DOC_INVT name |
| <GivenName>? | | VARCHAR | DOC_INVT name |
| <Surname> | | VARCHAR | DOC_INVT name |
| <Suffix>? | | VARCHAR | DOC_INVT name |
| <MilAddress>? | | VARCHAR | |
| <POBox>? | | VARCHAR | |
| <Street>? | | VARCHAR | |
| <City>? | | VARCHAR | |
| <State>? | | Apdx E Redbook | |
| <Country> | | WIPO St 3 | |
| <PostalCode>? | | VARCHAR | |
| <ElectronicAddress>? | | VARCHAR | |
| <Telephone>? | | VARCHAR | |
| <Fax>? | | VARCHAR | |
| <BranchOfService>? | | VARCHAR | |
| <Rule47/> | | N/A | |
| <CityOfResidence>? | | VARCHAR | |
| <StateOfResidence>? | | Apdx E Redbook | |
| <CountryOfResidence>? | | WIPO St 3 | |
| <Description>? | | VARCHAR | |
| <Assignee> | | N/A | DOC_ASSIGNEE |
| <OrgName>? | | VARCHAR | DOC_ASSIGNEE name |
| <GivenName>? | | VARCHAR | DOC_ASSIGNEE name |
| <Surname> | | VARCHAR | DOC_ASSIGNEE name |
| <Suffix>? | | VARCHAR | DOC_ASSIGNEE name |
| <City>? | | VARCHAR | DOC_ASSIGNEE name |
| <State>? | | Apdx E Redbook | |
| <Country> | | WIPO St 3 | |
| <PostalCode>? | | VARCHAR | |
| <Description>? | | VARCHAR | |
| <PrimaryExaminer>? | | N/A | |
| <GivenName>? | | VARCHAR | PTO PrimaryEx1Name |
| <Surname> | | VARCHAR | PTO PrimaryEx2Name |
| <SecondaryExaminer>* | | N/A | |
| <GivenName>? | | VARCHAR | PTO AsstEx1Name |
| <Surname> | | VARCHAR | PTO AsstEx2Name |
| <AdditionalExaminers>* | | VARCHAR | PTO ArtUnit |
| <PCTTransfer> | | N/A | PatCoopTreaty |
| <PubNo> | | NAMING CONVENTION | PCT WIPONo. |
| <PubDate> | | DATE | PCT PubDate |
| <AppNo> | | VARCHAR | PCT PCTNo. |
| <FilingDate> | | DATE | PCT FilingDate |
| <EuroPCT/>? | | N/A | |
| <MetDomesticFilingRequirements>? | | DATE | Date371 |
| <PriorArtEffectiveDate>? | | DATE | Date102e |

FIG.10H

| | | |
|---|---|---|
| <Abstract>? | [ ] | TEXT |
| <Description>? | [ ] | TEXT |
| <RelatedApplications>? | | TEXT |
| <GovernmentInterest>? | | TEXT |
| <BriefSummary>? | | TEXT |
| <DrawingDescription>? | | TEXT |
| <DetailedDescription>? | [ ] | TEXT |
| <Claims>? | [ ] | N/A |
| <Claim>+ | | TEXT |
| <SearchReport>? | | N/A |
| <FieldOfSearch>? | | N/A |
| <USClass>* | | SEE ABOVE |
| <USClassMisc>* | | VARCHAR |
| <IPC>* | | SEE ABOVE |
| <Drawings>? | [ ] | |
| <OCRBib> | [ ] | |
| TEXTTAGS | | N/A |
| FORMATTING | | ? |
| IMAGE | | TIFF? |
| MathML | | MathML |
| ChemML | | ChemML |
| TABLES | | TABLES? |
| ENTITIES | | ENTITIES? |
| NUCLEOTIDE SEQUENCES | | ? |
| CHARACTER SETS | | ? |
| LISTS | | ? |
| CHANGES | | ? |
| FOOTNOTES | [ ] | ? |

FIG.101

```
<?xml version="1.0"?>
```

<!--Version 1.0a of the IPAM Electronic Document Order and Download Protocol-->

<!--Expected Usage:-->
<!--IPAM sends EODOrderReq1.0a, Aurigin responds with EODOrderAck1.0a-->
<!--IPAM sends (0,n) EODQueryReq1.0a, Aurigin responds EODQueryAck1.0a-->
<!--IPAM sends EODDownloadReq1.0a, Aurigin responds with EODDownloadAck1.0a-->
<!--if there is anything to download, Ack contains list of ShipmenntIDs-->
<!--IPAM sends EODShipmentReq1.0a, Aurigin responds with EODShipmentAck1.0a-->
<!--Shipment Ack contains URLs of all of the parts that make upa shipment-->
<!--IPAM downloads all of these parts and installs them.-->
<!--When download is successful, IPAM sends EODShipmentDone1.0a.-->
<!--No reply is necessary from Aurigin......
    -->

<!--IPAM Electronic Document Order REQUEST-->
<!--Issued by IPAM Server at customer site to Aurigin-->

<!--ELEMENT EODOrderReq1.0a (ServerID, (DOC)+, UserInfo)>

<!ELEMENT ServerID      (#PCDATA)>
<!ELEMENT Doc           (#PCDATA)>
<!ELEMENT UserInfo      (Email, DeptID, UserID)>

<!ELEMENT Email         (#PCDATA)>
<!ELEMENT DeptID        (#PCDATA)>
<!ELEMENT UserID        (#PCDATA)>

<!--IPAM Electronic Document Order ACKNOWLEGEMENT-->
<!--Issued by Aurigin in response to request-->

<!ELEMENT EODOrderAck1.0a (Valid|EODOrderError)>

<!--Valid can send a message back that can go to the GUI-->
<!ELEMENT Valid         (#PCDATA)

<!ELEMENT EODOrderError (ParseError|NoProto|UnkProto|InvalidServer)>

FIG. 17A

```
<!--ParseError contains the XML parse error.-->
<!ELEMENT ParseError (ErrorCode, URL, Reason, srcText, Line, LinePos,
FilePos)>
<!ELEMENT ErrorCode        (#PCDATA)>
<!ELEMENT URL              (#PCDATA)>
<!ELEMENT Reason           (#PCDATA)>
<!ELEMENT srcText          (#PCDATA)>
<!ELEMENT Line             (#PCDATA)>
<!ELEMENT LinePos          (#PCDATA)>
<!ELEMENT FilePos          (#PCDATA)>

<!--NoProto=No Doctype-->
<!ELEMENT NoProto          EMPTY >

<!--UnkProto=Root node is not EODOrderReq1.0a -- >
<!ELEMENT UnkProto         EMPTY >

<!--InvalidServer: not sure if ServerID will be validated-->
<!ELEMENT InvalidServer    EMPTY >

<!--IPAM Electronic Document Query REQUEST-->
<!--Issued by IPAM Server at customer site to Aurigin-->

<!ELEMENT EODQueryReq1.0a (ServerID, (Doc)+, DocFormat)>
<!ELEMENT DocFormat        (#PCDATA)>

<!--IPAM Electronic Document Query ACKNOWLEDGEMENT-->
<!--Issued by Aurigin in response to request-->

<!ELEMENT EODQueryAck1.0a  ((DocStatus)+|EODQueryError)>
<!ELEMENT DocStatus        (Doc, Status, Link)>
<!ELEMENT Status           (#PCDATA)>
<!ELEMENT Link             (#PCDATA)>
<!ELEMENT EODQueryError    (ParseError|InvalidServer|InvalidFormat)>
<!ELEMENT InvalidFormat    EMPTY >

<!--IPAM Download Request-->
<!--Issued by IPAM Server at customer site to Aurigin-->
```

FIG. 17B

```
<!ELEMENT EODDownloadReq1.0a (ServerID)>

<!--IPAM Electronic Document Order ACKNOWLEGEMENT-->
<!--Issued by Aurigin in response to request-->

<!ELEMENT EODDownloadAck1.0a  ((ShipInfo)*|EODDownloadError)>
<!ELEMENT ShipInfo            (ShipID, ShipType)>
<!ELEMENT ShipID              (#PCDATA)>
<!ELEMENT ShipType            (SubscriptionShip|OrderShip|CancelledShip)>
<!ELEMENT SubscriptionShip    EMPTY >
<!ELEMENT OrderShip           EMPTY >
<!ELEMENT EODDownloadError    (ParseError|InvalidServer)>

<!--IPAM Shipment REQUEST-->
<!--Issued by IPAM Server at customer site to Aurigin-->

<!ELEMENT EODShipmentReq1.0a (ServerID, ShipID)>

<!--IPAM Shipment ACKNOWLEGEMENT-->
<!--Issued by Aurigin in response to request-->

<!ELEMENT EODShipmentAck1.0a  ((ChunkURL)+|EODShipmentError)>
<!ELEMENT ChunkURL            (#PCDATA)>
<!ELEMENT EODShipmentError    (ParseError|InvalidServer|InvalidShipID)>
<!ELEMENT InvalidShipID       EMPTY >

<!--IPAM Shipment COMPLETE-->
<!--Issued by IPAM Server at customer site to Aurigin-->

<!ELEMENT EODShipmentDone1.0a (ServerID, ShipID)>
```

FIG. 17C

INTELLECTUAL ASSET PROTOCOL FOR DEFINING DATA EXCHANGE RULES AND FORMATS FOR UNIVERSAL INTELLECTUAL ASSET DOCUMENTS, AND SYSTEMS, METHODS, AND COMPUTER PROGRAM PRODUCTS RELATED TO SAME

CROSS-REFERENCE TO OTHER PATENTS AND APPLICATIONS

The present application claims priority to the provisional application entitled, "Comprehensive Patent Markup Language Data Type Definition, and Systems, Methods, and Computer Program Products Related to Same," invented by Hohmann et al., Provisional Appl. No. 60/128,405, Filed: Apr. 8, 1999. (incorporated by reference in its entirety).

The present application is a continuation-in-part application to the following applications:

"Using Hyperbolic Trees to Visualize Data Generated by Patent-Centric and Group-Oriented Data Processing," invented by Rivette et al., from application Ser. No. 08/921,369; Filed: Aug. 29, 1997, now U.S. Pat. No. 6,339,767, "System, Method, and Computer Program Product for Managing and Analyzing Intellectual Property (IP) Related Transactions," invented by Rivette et al., application Ser. No. 09/138,368; Filed: Aug. 21, 1998, "Intellectual Property Asset Manager (IPAM) for Context Processing of Data Objects," invented by Rivette et al., application Ser. No. 09/260,079, Filed: Mar. 2, 1999, pending (incorporated by reference in its entirety); and "System, Method, and Computer Program Product for Creating Subnotes Linked to Portions of Data Objects After Entering an Annotation Mode," invented by Rivette et al., application Ser. No. 09/057,557; Filed: Apr. 9, 1998, now U.S. Pat. No. 6,389,434;

The present application is related to the following applications and patents:

"Method and Apparatus for Synchronizing, Displaying and Manipulating Text and Image Documents," invented by Rivette er al., U.S. Pat. No. 5,623,681, issued Apr. 22, 1997, from application Ser. No. 08/155,572, filed Nov. 19, 1993, issued (incorporated by reference in its entirety);

"System and Method and Computer Program Product for Using Intelligent Notes to Organize, Link, and Manipulate Disparate Data Objects," invented by Rivette et al., U.S. Pat. No. 5,806,079, issued Apr. 17, 1996 from application Ser. No. 08/632,801; Filed: Apr. 17, 1996 (incorporated by reference in its entirety);

"Method and Apparatus for Sychronizing, Displaying and Manipulating Text and Image Documents", invented by Rivette et at., U.S. Pat. No. 5,809,318, issued Sep. 15, 1998 from application Ser. No. 08/832,971; filed Apr. 4, 1997 (incorporated by reference in its entirety);

"System, Method, and Computer Program Product for Accessing a Note Database Having Subnote Information for the Purpose of Manipulating Subnotes Linked to Portions of Documents," invented by Rivette et al., U.S. Pat. No. 5,950,214, issued Sep. 7,1999 from application Ser. No. 09/058,275; Filed: Apr. 10, 1998 (incorporated by reference in its entirety);

"System, Method, and Computer Program Product for Patent-Centric and Group-Oriented Data Processing," invented by Rivette et al., U.S. Pat. No. 5,991,751, issued Nov. 23, 1999 from application Ser. No. 08/867,392; Filed: Jun. 2, 1997 (incorporated by reference in its entirety);

"System and Method for Developing and Maintaining Documents," invented by Rivette et al., U.S. Pat. No. 5,754,840, issued May 19, 1998, from application Ser. No. 08/590,082, filed Jan. 23, 1996 (incorporated by reference in its entirety); and "System, Method, and Computer Program Product for Generating Equivalent Text Files," invented by Rivette et al., U.S. Pat. No. 5,799,325, issued Aug. 25, 1998, from application Ser. No. 08/662,377, filed Jun. 12, 1996 (incorporated by reference in its entirety).

BACKGROUND OF THE INVENTION

1. Field of the Invention

The present invention is generally related to tools for data processing, and more particularly related to an intellectual asset protocol for defining data exchange rules and formats for universal intellectual asset data objects, such as documents.

2. Related Art

Intellectual asset documents may include patents (U.S. and foreign), patent applications (U.S., PCT and foreign), trademarks (U.S. and foreign), trademark applications (U.S. and foreign), copyrights, trade secrets, license agreements, joint venture agreements, or any other type of data object that involves intellectual property. The efficient management of intellectual asset documents requires a structured way of exchanging data that represents one or more of these intellectual asset documents and/or the systems and processes that relate to them. These processes may include license tracking; audits and payments; patent and trademark prosecution and workflow; patent and trademark maintenance fee payment tracking and reporting; reporting and visualization of intellectual asset meta data; electronic submission of patent and trademark application; and so forth. Prior to the present invention, this structured way of exchanging data did not exist.

Individuals and/or industries that deal with intellectual asset documents (or are involved in the intellectual asset domain) are comprised of many different players. For example, one player is the U.S. Patent and Trademark Office, another player is the European Patent Office, another player is an enterprise resource planning manager, yet another player is a patent applicant, still another player is a patent or trademark licensor, etc. These players operate at times independent of each other, yet at other times must come together to facilitate an objective. For example, a patent applicant must work with the U.S. Patent and Trademark Office to prosecute his or her patent and/or trademark application. When two or more players come together to facilitate an objective, it would be advantageous for the players to operate with an electronic version of one or more intellectual asset data objects or documents. However, this often does not happen due to the lack of data exchange rules and formats for intellectual asset data objects. Without a standard definition of data exchange rules and formats for intellectual asset documents, the progress of the players' common objective is likely to be hindered.

Cooperation among players in the intellectual asset domain is hindered because, often, the players use different formats for intellectual asset documents. With the computerization of industries today and the use of the Internet by many different players in the intellectual asset domain, the use of different formats of intellectual assets documents hinders the efficient exchange of electronic intellectual asset documents among the different players.

Therefore, what is needed an intellectual asset protocol for defining data exchange rules and formats for universal intellectual asset documents to increase the effectiveness and efficiency of exchanging electronic intellectual asset data objects. In addition, the protocol should be sufficiently flexible and full-featured to enable other types of functions, such as but not limited to, the management of intellectual asset transaction data for various business processes. The invention defines a standard for intellectual asset meta-data, and thus provides an effective and efficient way to exchange data between disparate intellectual asset software systems and Enterprise Resource Planning (ERP) systems.

SUMMARY OF THE INVENTION

The present invention is directed to an intellectual asset protocol for defining data exchange rules and formats for universal intellectual asset data objects, and systems, methods, and computer program products related to same. The present invention includes an intellectual asset protocol system that acts as an engine in the definition of data exchange rules and formats for universal intellectual asset documents. The present invention also includes a front end system that preferably provides a graphical user interface to the users of the present invention to access the intellectual asset protocol system. The present invention may also include an intellectual asset database that stores collections of intellectual asset documents (and information related to same), one or more embodiments of an intellectual asset protocol, and so forth. The intellectual asset protocol system interacts with an Intellectual Property Asset Manger (IPAM) server 105, as will be described below.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIGS. 7A–7E illustrate an example CPML DTD according to an embodiment of the present invention;

FIGS. 8A–8F illustrate an example CPML intellectual asset document for a U.S. patent according to an embodiment of the present invention;

FIGS. 9A–9G illustrate an example CPML intellectual asset document for an EP application according to an embodiment of the present invention;

FIGS. 10A–10I illustrate the mapping between the CPML DTD and other patent related DTDs according to an embodiment of the present invention;

FIGS. 17A–17C illustrate how the present invention supports an electronic document order and download protocol DTD according to an embodiment of the present invention;

DETAILED DESCRIPTION OF THE PREFERRED EMBODIMENTS

Table of Contents

I. Overview of The Present Invention
II. System Architecture
   A. System Architecture Overview
   B. An Example Implementation of the Present Invention
III. CPML DTD According to an Embodiment of the Present Invention
   A. The CPML DTD Is a Union of the Structured Document Data Recognized and Served by Embodiment of the IPAM Server
   B. The CPML DTD Supports Additional Structures
   C. The CPML DTD Uses ISO Standard Codes and Readable Naming Conventions for its Tags
   D. The EQV Format Can Be Replaced with the CPML DTD in IPAM Server
   E. The CPML DTD Retains as Much Information Present in the Original Documents as Practical, Including Chemical, Table, and Mathematical Information
   F. The CPML DTD Includes a IPAM Server Interface for Accessing Groups and Annotations via an XML Interface G. The CPML DTD Includes a Set of XML Interfaces for Third-party Content Managers That Allows Users to Use Those Content Managers via IPAM in the Future H. The CPML DTD provides Claims Structure Support IV. Example CPML DTD According to an Embodiment of the Present Invention V. Example CPML Intellectual Asset Document—U.S. Patent VI. Example CPML Document—European Patent VII. Correspondence Between CPML DTD and Other Patent DTDs and Example Database Implementation VIII. Detailed Description of the Functions of the Intellectual Asset Protocol System of the Present Invention A. Intellectual Asset Protocol Function
  B. Intellectual Asset Data and Processing Exchange Function
  C. Presentation Function
  D. Administration Function IX. General System Operation X. Inputting Data From XML and Non-XML Documents XI. Electronic Document Order and Download DTD XII. Alternative Embodiment of the Intellectual Asset Protocol of the Present Invention—SPML (SmartPatents Markup Language)

A. Document Header of the SPML File
  B. Bibliographic Data of the SPML File
    1. BibText
    2. BibNumber
    3. BibDate
    4. BibSection
    5. BibListOf
  C. Formatted Document Text Data of the SPML File
    1. Section
    2. Paragraph
    3. Line
    4. Text
    5. PageBreak
    6. VertSpace
    7. SpecialChar
  D. Streaming Mechanisms of the Present Invention
  E. Adapter Classes of the Present Invention XIII. Conclusion

DETAILED DESCRIPTION OF THE PREFERRED EMBODIMENTS

I. Overview of The Present Invention

The present invention includes an intellectual asset protocol for enabling the definition of the data and format of intellectual asset documents to facilitate the efficient exchange of electronic intellectual asset documents between disparate systems. The present invention contemplates an Intellectual Property Asset Manger (IPAM) server 105, an intellectual asset protocol system 110, a front end system 113, and an intellectual asset database 135 as shown in FIG. 1 and described in detail below.

II. System Architecture

A. System Architecture Overview

Figure 1:
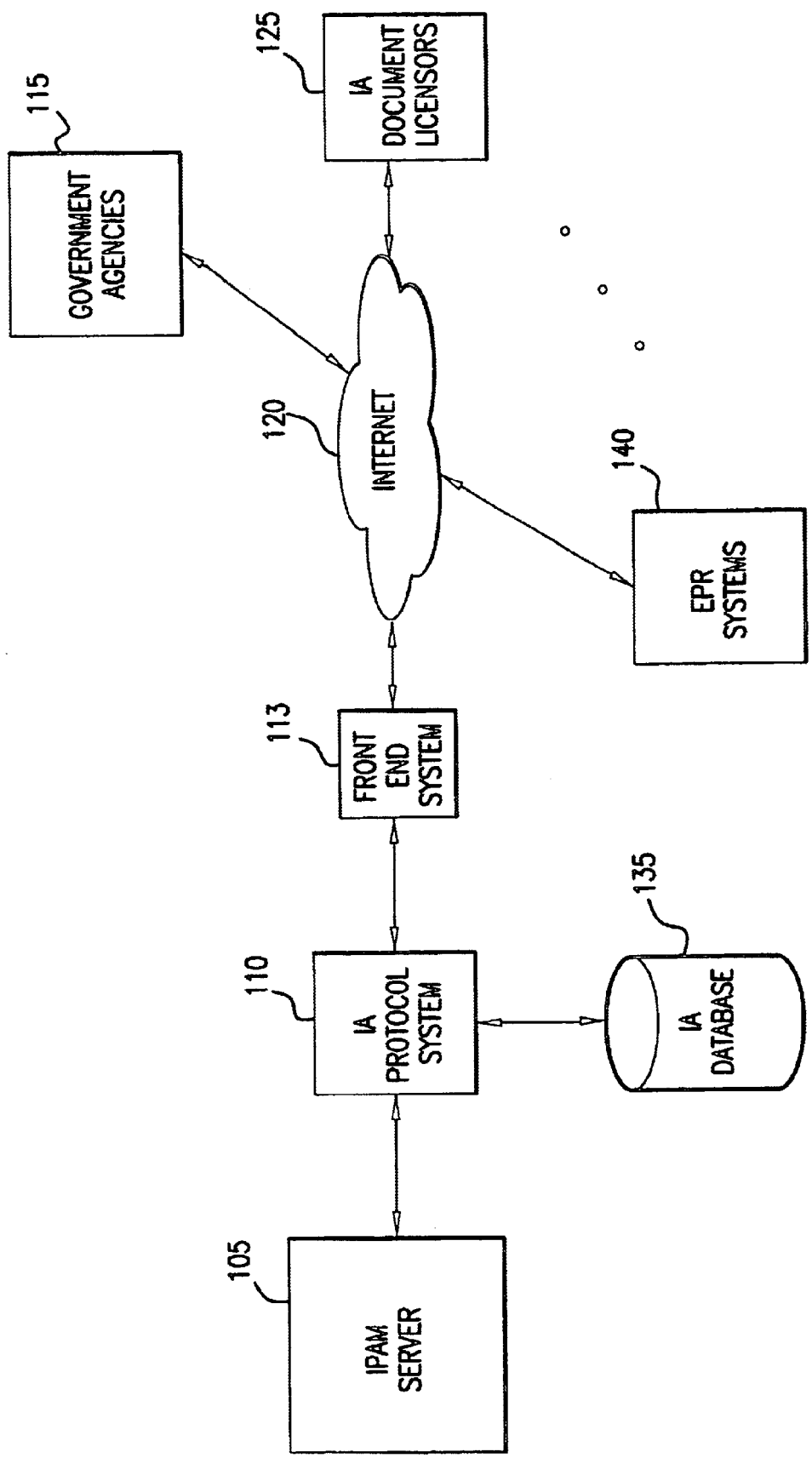
FIG. 1 is a block diagram representing an operating environment according to an embodiment of the present invention.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. FIG. 1 illustrates an example environment that includes an IPAM server 105, an intellectual asset protocol system 110, a front end system 113, an intellectual asset database 135, the global Internet 120 or other communication medium, government agencies 115, one or more intellectual asset document licensors 125 and/or one or more EPR systems 140.

Figure 3:
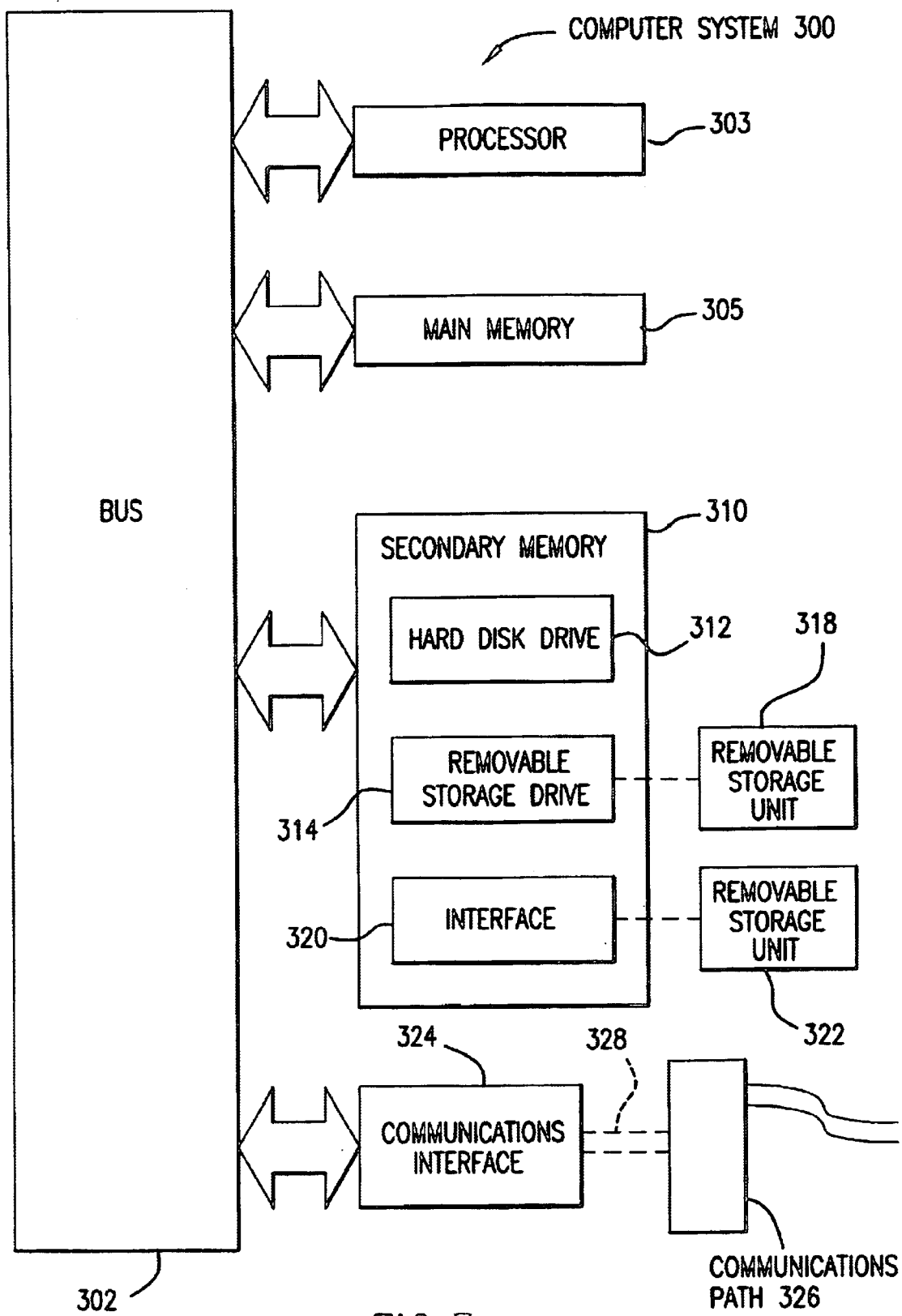
FIG. 3 is a block diagram of a computer system preferably used to implement the present invention according to an embodiment of the present invention.

As described below with reference to FIG. 3, IPAM server 105, intellectual asset protocol system 110, front end system 113 and intellectual asset database 135 may be implemented using hardware, software or a combination thereof and may be implemented in one or more computer systems or processing systems. Intellectual asset protocol system 110 will be described next.

Intellectual asset protocol system 110 acts as an engine for the present invention in the standardization of intellectual asset documents. Intellectual asset protocol system 110 is connected to IPAM server 105 and intellectual asset database 135. Intellectual asset protocol system 110 is also connected to the Internet 120 via the front end system 113. Requests from users can be made via front end system 113 to intellectual asset protocol system 110. The various functions provided by the present invention are not dependent on the source of the data. Although the embodiment of the present invention shown in FIG. 1 illustrates IPAM server 105, intellectual asset protocol system 110, front end system 113 and intellectual asset database 135 as separate functional components, several (or all) components may be combined as long as the functionality of each component still exists within the present invention as will be described below. IPAM server 105 will be described next.

IPAM server 105 is described in detail in the applications and patents referenced above in the section entitled "Cross-Reference to Other Patents and Applications." For convenience, IPAM server 105 will briefly be discussed herein, although the invention is not limited to this brief description. Briefly stated, IPAM server 105 deals with context data processing. IPAM server 105 may be used to define and select one or more contexts. Each context includes one or more attributes, and a plurality of data objects that satisfy the attributes. A list of data objects contained in the selected contexts may be displayed. At least some of the data objects in the selected contexts may be processed. Such processing may involve generating hierarchical and/or directed acyclic graph data structures to represent relationships among the data objects. These data structures can then be displayed in a variety of well-known techniques including but not limited to hyperbolic trees. Examples of such hierarchical or directed acyclic graph structures include claim trees, citation trees, and data object families, which may be displayed using hyperbolic trees.

In an embodiment, the contexts are groups. In other embodiment, the contexts are each associated with a data object type. In this latter embodiment, the contexts include data objects of their respective data object types.

IPAM server 105 also supports the generation of annotations. IPAM server 105 supports a plurality of annotation types, including document annotations, group annotations, data object type annotations, case annotations, and enterprise annotations. IPAM server 105 also supports form-based annotations.

In an embodiment, IPAM server 105 has a plug-in manager coupled thereto. The system shown in FIG. 1 may also include at least one plug-in coupled to the plug-in manager, and at least one external data processing component coupled to the plug-in. In an embodiment, the external data processing component displays data using at least graphs. In another embodiment, the external data processing component displays data using at least maps. The plug-in manager has a first application programming interface (API), and each external data processing component has a second API. The plug-in translates messages from the plug-in manager to the external data processing component to a format conforming to the second API, and translates messages from the external data processing component to the plug-in manager to a format conforming to the first API.

Embodiments of IPAM server 105 can process, display, and otherwise operate with patent equivalent text files (EQV). (Other embodiments of IPAM server 105 operate with other types of data.) Patent equivalent text files are described in U.S. Pat. No. 5,623,681, which is herein incorporated by reference in its entirety. A patent equivalent text file includes equivalency information that establishes an equivalency relationship between the text in the patent equivalent text file and the image in the patent image file. For example, this equivalency information may include pagination information that enables the patent equivalent text file to be displayed having the same pagination (line breaks, column breaks, page breaks) as the patent image file. In an embodiment, a pagination module generates the patent equivalent text file by comparing the patent text in the patent text file with the patent image file to detect equivalency information. This equivalency information is then embedded in the patent equivalent text file, along with the patent text. While the pagination module is capable of performing the pagination operation automatically, in some cases some manual intervention is required. In accordance, an operator is sometimes involved with the pagination process performed by the pagination module. Front end system 113 of the present invention will be described next.

Front end system 113 may operate as a Web server. A Web server provides a GUI to users who wish to access intellectual asset protocol system 110. As is well-known in the relevant art(s), a Web server is a server process running at a Web site which sends out Web pages in response to Hypertext Transfer Protocol (HTTP) requests from remote browsers. An optional firewall (not shown) serves as the connection and separation between intellectual asset protocol system 110 and the global Internet 120. Generally speaking, a firewall—which is well-known in the relevant art(s)—is a dedicated gateway machine with special security precaution software. It is typically used, for example, to service Internet 120 connections and dial-in lines, and protects a cluster of more loosely administered machines hidden behind it from an external invasion. Intellectual asset database 135 of the present invention will be described next.

Intellectual asset database 135 stores collections of data that represent the current embodiments of intellectual asset protocols, intellectual asset documents and their processes, etc., used by the present invention. Here, in an embodiment, data stored in intellectual asset database 135 may be stored as a relational database. In a relational database, data is stored in the form of related tables. A relational database management system (DBMS) is used to manipulate data in the related tables. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

Another embodiment of the type of database used by intellectual asset database 135 is a database design known as Hypertext. In a Hypertext database, any object, whether it be a piece of text, a picture, or a film, can be linked to any other object. Hypertext databases are particularly useful for organizing large amounts of disparate information, but they are not generally designed for numerical analysis.

Intellectual asset database 135 of present invention may also be implemented using a standard database access method such as Open DataBase Connectivity (ODBC). The goal of ODBC is to make it possible to access any data from any application, regardless of which DBMS is handling the data. ODBC manages this by inserting a middle layer, called a database driver, between an application and the DBMS. The purpose of this layer is to translate the application's data queries into commands that the DBMS understands. For this to work, both the application and the DBMS must be ODBC-compliant—that is, the application must be capable of issuing ODBC commands and the DBMS must be capable of responding to them. Both the functions of the engine of IPAM server 105 and intellectual asset protocol system 110, and the data stored in intellectual asset database 135, will be discussed in further detail below. The global Internet 120 will be described next.

The global Internet 120 includes a plurality of external workstations (for example, government agencies 115, intellectual asset document licensors 125 and EPR systems 140, as shown in the embodiment of FIG. 1) that allow users (e.g., players within the intellectual asset domain) of the Internet 120 to remotely access and use intellectual asset protocol system 110 (via front end system 113). Note that the present invention may communicate with these external workstations via communication methods other than the Internet 120 (via Transmission Control Protocol/Internet Protocol (TCP/IP)), including, but not limited to, asynchronous dial up and asynchronous lease line. Asynchronous dial up, asynchronous lease line, and TCP/IP communication are well known terms in the relevant art.

Government agencies 115 and intellectual asset document licensors 125 are addressed next.

Government agencies 115 include the U.S. Patent and Trademark Office, patent and trademark offices in foreign countries, and government agencies that are in the intellectual asset domain. Intellectual asset document licensors 125 include business entities or individuals who license an intellectual asset document. ERP (Enterprise Resource Planning) system 140 is described next.

ERP system 140 integrates many facets of a business, including planning, manufacturing, sales and marketing. As the ERP methodology has become more popular, software applications have emerged to help business managers implement ERP. Often EPR involves intellectual asset documents and the need to transfer and receive electronic intellectual asset documents with disparate intellectual asset software systems.

Figure 2:
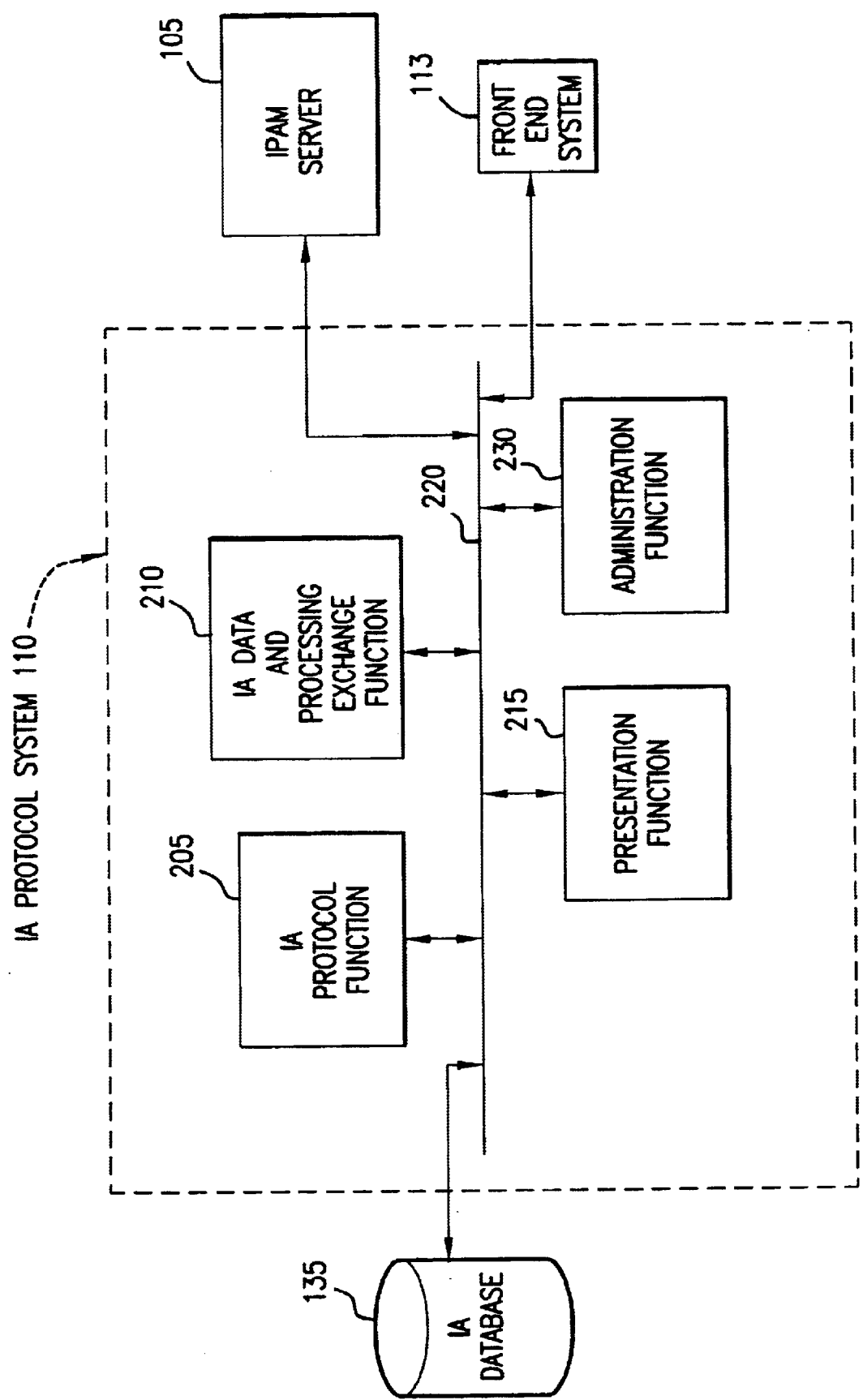
FIG. 2 is a block diagram of functions or modules of the present invention connected by a network according to an embodiment of the present invention.

FIG. 2 is a block diagram of the functions or modules of intellectual asset protocol system 110 preferably connected by a network according to an embodiment of the present invention. It should be understood that the particular intellectual asset protocol system 110 in FIG. 2 is shown for illustrative purposes only and does not limit the invention. Other implementations for performing the functions described herein will be apparent to persons skilled in the relevant art(s) based on the teachings contained herein, and the invention is directed to such other implementations. As will be apparent to one skilled in the relevant art(s), all of the functions "inside" of intellectual asset protocol system 110 are preferably connected and communicate via a communication medium such as a network 220.

The topology of network 220 as shown in FIG. 2 is called a bus topology. In general, the topology of a network is the geometric arrangement of functions (i.e., computers) within the system. Other common types of network topologies include star and ring topologies. Although the present invention is illustrated in FIG. 2 as incorporating a bus topology, the present invention can equally be applied to other topologies.

The functions of intellectual asset protocol system 110 include an intellectual asset protocol function 205, an intellectual asset data and processing exchange function 210, a presentation function 215 and an administration function 220. The invention is not limited to these functions. The functions of intellectual asset protocol system 110 shown in FIG. 2 will be described in detail below in Section VIII after the description of an embodiment of the intellectual asset protocol of the present invention.

B. An Example Implementation of the Present Invention

The present invention (i.e., IPAM server 105, intellectual asset protocol system 110, front end system 113, intellectual asset database 135, or any part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 300 is shown in FIG. 3. The computer system 300 includes one or more processors, such as processor 303. The processor 303 is connected to a communication bus 302. Various software embodiments are described in terms of this exemplary computer system. After reading this description, it will be apparent to a person skilled in the relevant art how to implement the invention using other computer systems and/or computer architectures.

Computer system 300 also includes a main memory 305, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As wilt be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means may include, for example, a removable storage unit 322 and an interface 320. Examples of such may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a PCM-CIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, a phone line, a cellular phone link, an RF link and other communications channels.

In this document, the term "computer program product" refers to removable storage units 318, 322, and/or signals 328. These computer program products are means for providing software and/or data to computer system 300. The invention is directed to such computer program products.

Computer programs (also called computer control logic) are stored in main memory 305, and/or secondary memory 310 and/or in computer program products. Computer programs may also be received via communications interface 324. Such computer programs, when executed, enable the computer system 300 to perform the features of the present invention as discussed herein. In particular, the computer programs, when executed, enable the processor 303 to perform the features of the present invention. Accordingly, such computer programs represent controllers of computer system 300.

In an embodiment where the invention is implemented using software, the software may be stored in a computer program product and loaded into computer system 300 using removable storage drive 314, hard drive 312 or communications interface 324. The control logic (software), when executed by processor 303, causes processor 303 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

An embodiment of the intellectual asset protocol of the present invention is described next.

III. CPML DTD According to an Embodiment of the Present Invention

As discussed above, intellectual asset database 135 stores data objects that comply with one or more embodiments of the intellectual asset protocol of the present invention. In one embodiment of the present invention, the universal intellectual asset protocol is implemented as a Comprehensive Patent Markup Language (CPML) Document Type Definition (DTD) that conforms to Extended Markup Language (XML). Here, documents conforming to the CPML DTD are called CPML documents or, sometimes, universal intellectual asset documents (discussed above). As these names indicate, the CPML DTD of the present invention is very powerful and can be used for many functions, as will be described below with reference to FIG. 4.

In essence, the CPML DTD is an XML intellectual asset protocol that specifies the data rules and format for intellectual asset management. This is very different, for example, from the USPIO Red Book specification and CML concerned with document presentation. In some embodiments, the CPML DTD includes these DTDs in its applications. Although both DfDs and XML are well known in the relevant art(s), brief overviews of DTDs and XML are provided next.

As will be discussed above, computer programs when executed, enable computer 300 (FIG. 3) to perform the functions of the present invention as discussed herein. In an embodiment, the present invention is implemented using active server pages, XML and stored procedures. XML is a presentation markup language and is used as a data description language. XML is a pared-down version of SGML and is designed especially for Web documents. XML enables designers to create their own customized tags to provide functionality not available with HTML. For example, XML supports links that point to multiple documents, as opposed to HTML links, which can reference just one destination each.

A tag is a command or marker inserted in a document that specifies how the document, or a portion of the document, should be formatted. Tags are used by format specifications that store documents as text files. This includes SGML and HTML. Therefore, in an embodiment of the present invention, a designer would implement each of the functions of intellectual asset protocol function 205 as a tag.

The type of file associated with SGML and XML documents is called a document type definition or DTD. DTD is a type of file that defines how the tags should be interpreted by the application presenting the document. The HTML specification that defines how Web pages should be displayed by Web browsers is one example of a DTD. In essence, a DTD to the present invention represents a contract between the players in the intellectual asset domain that intellectual asset documents will conform to a particular standard. The CPML DTD of the present invention will next be described in more detail with reference to FIG. 4.

Figure 4:
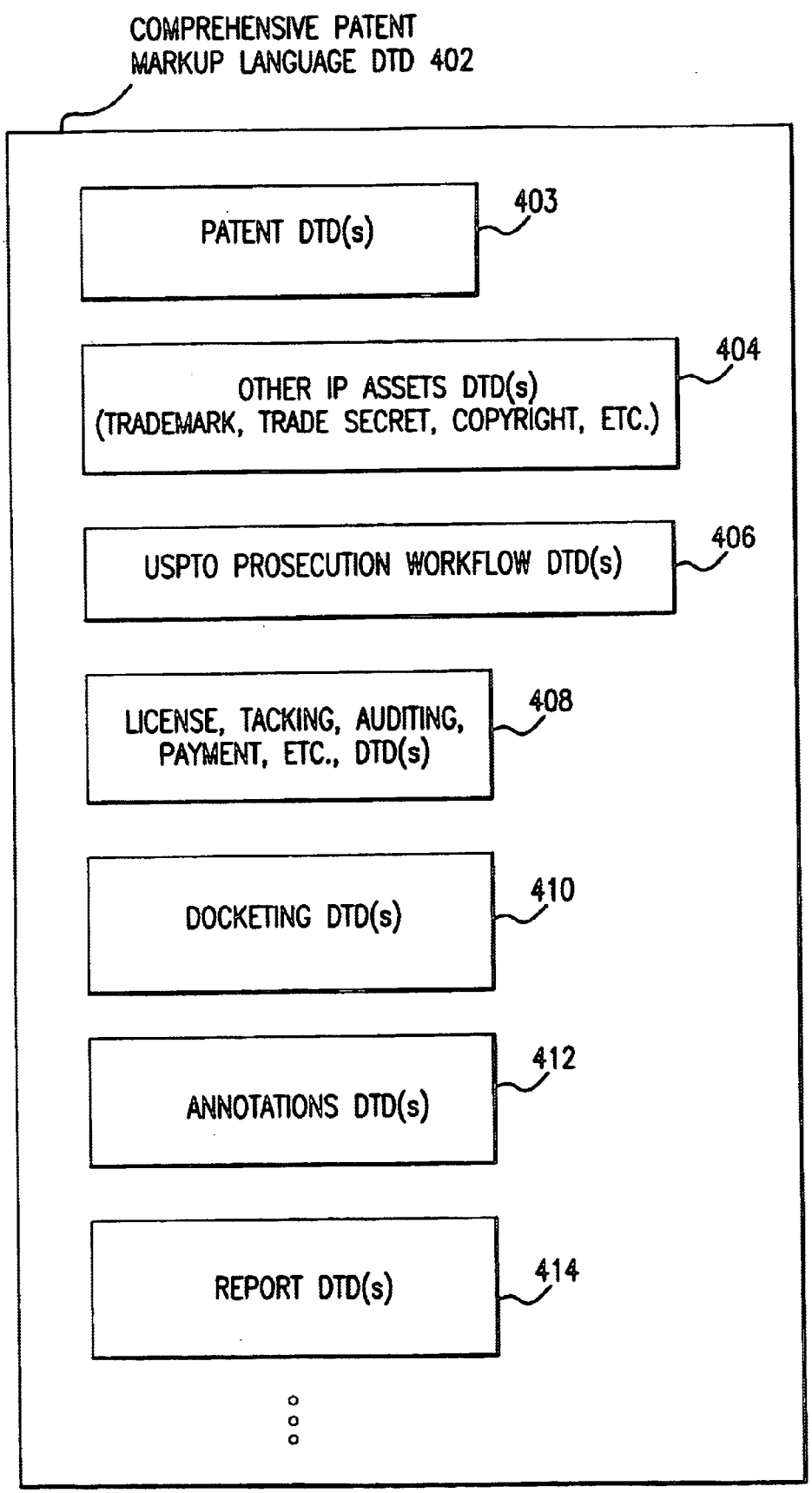
FIG. 4 is a block diagram illustrating an example CPML DTD according to an embodiment of the present invention.

FIG. 4 conceptually illustrates the comprehensive patent markup language (CPML) DTD 402 according to embodiments of the invention. The CPML DTD 402 includes a plurality of other DTDs. Alternatively, the components of the CPML DTD 402 shown in FIG. 4 may be grouped together as one or more separate DTDs. Preferably, the DTDs of FIG. 4 conform to XML, although the invention is not limited to this embodiment.

Figure 5:
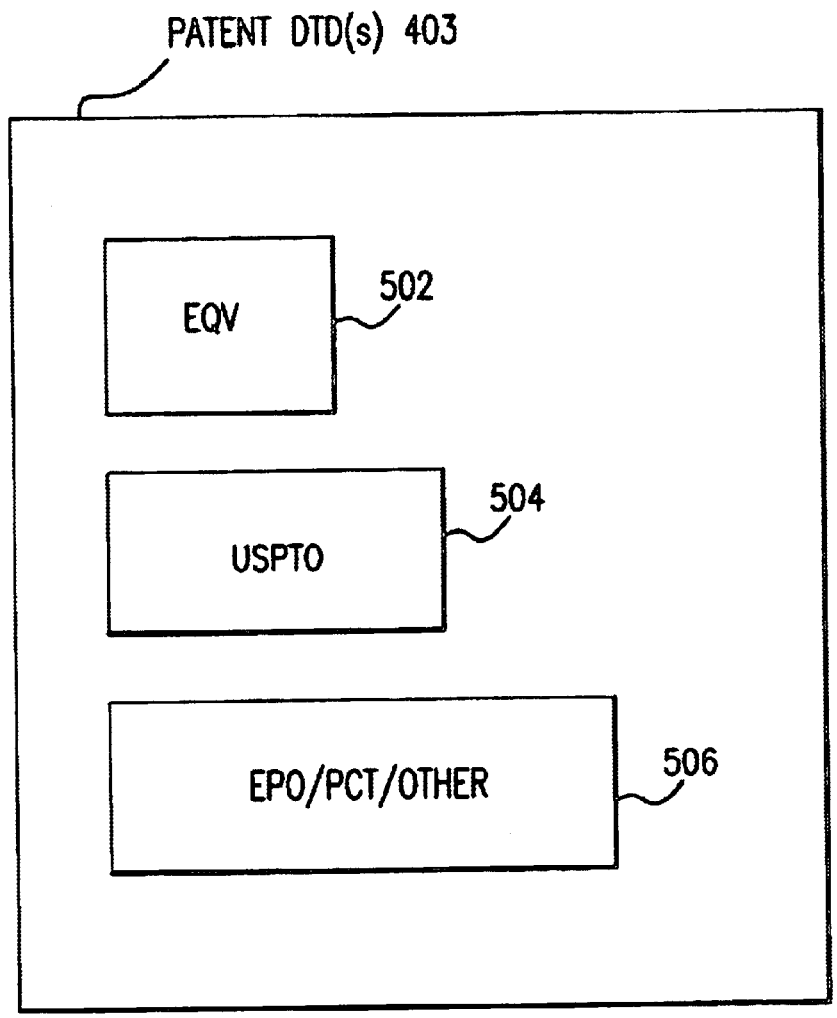
FIG. 5 is a block diagram illustrating an example patent DTD according to an embodiment of the present invention.

The CPML DTD 402 includes one or more patent DTDs 403. These patent DTDs 403 are a representation of patent documents. As shown in FIG. 5, the patent DTDs 403 may include or be representative of the USPIO Red Book DTD 504 (which is described in the specification of the USPTO Red Book published by the USPTO (dated March 1998, which is herein incorporated by reference in its entirety), and/or patent DTDs of other patent offices, such as the PCT or EPO DTDs 506. The patent DTDs 403 may also include or be representative to information included in patent equivalent text files (EQV) 502 (as described above).

The CPML DTD 402 includes DTDs 404 to support and represent other IP (intellectual property) assets, such as trade marks, trade secrets, copyright, conception documents, etc.

The CPML DTD 402 includes DTDs 406 to represent USPTO and/or other patent office prosecution.

The CPML DTD 402 includes DTDs 408 to represent and support patent licensing, tracking, auditing, payment, etc.

The CPML DTD 402 includes DTDs 410 to represent and support any types of docketing activities.

The CPML DTD 402 includes DTDs 412 to represent and support annotations, and the exchange of same. Annotation functionality is described in the patents and applications listed in the above section entitled "Cross-Reference to Other Patents and Applications."

The CPML DTD 402 includes DTDs 414 to represent and support reports and reporting activities.

The CPML DTD 402 is not limited to the functionality shown in FIG. 4. The example of FIG. 4 is provided for illustrative purposes only.

Figure 6:
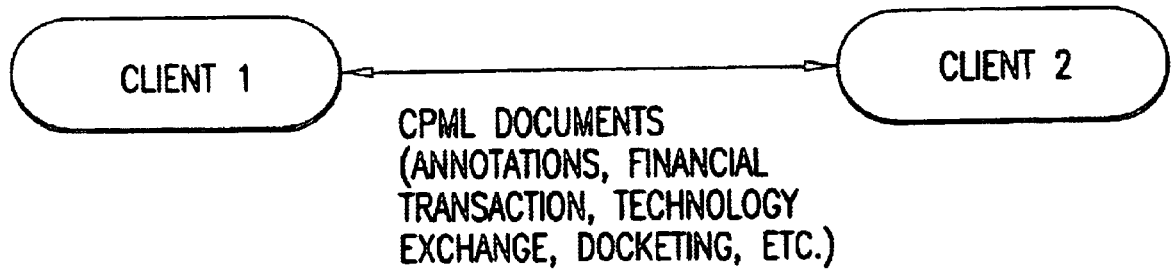
FIG. 6 is a flow diagram illustrating some of the types of CPML intellectual asset documents that may be transferred between clients according to an embodiment of the present invention.

FIG. 6 illustrates various types of CPML intellectual asset documents (that conform to CPML DTD 402) that can be exchanged between two players or clients in the intellectual asset domain. Next, a variety of features of the CPML DTD of the present invention are described.

A. The CPML DTD Is a Union of the Structured Document Data Recognized and Served by Embodiment of the IPAM Server The CPML DTD specification contains a union of the structured bibliographic data that is used by embodiments of the IPAM server 105. In embodiments, this data includes subtables of the $IP_{13}DOCUMENT$ table and their satellites in the IPAM server database, plus the abstracts that reside in the searching database (indexes). This ensures that IPAM server 105 can extract the data it needs strictly from the XML, potentially without even the indexes and database flatfiles Production supplies. For more information on IPAM server 105, see the applications and patents referenced above in the section entitled "Cross-Reference to Other Patents and Applications."

B. The CPML DTD Supports Additional Structures

When the incoming data's normalization varies, the CPML DTD has sections for unnormalized data and repeats the data in the normalized format as necessary. The normalized versions are optional. For example:

```
<Inventor>
Matt Schnitz
1975 Landings Drive
Mountain View, CA 94043
    <Name>
        Matt Schnitz
        <Surname>Schnitz</Surname>
        <GivenName>Matt</GivenName>
    </Name>
    <Address>
        1975 Landings Drive
        Mountain View, CA 94043
        <Street>1975 Landings Drive</Street>
        <City>Mountain View</City>
        <State>CA</State>
        <Country>US</Country>
        <PostalCode>94043</PostalCode>
    </Address>
</Inventor>
```

This policy makes sure that the application using the data has the level of normalization it is capable of supporting, and that the data has the best level of normalization we can supply.

C. The CPML DTD Uses ISO Standard Codes and Readable Naming Conventions for its Tags As demonstrated in the example in Section (b) above, standards are used when possible. For example, "US" is the ISO standard code for the United States and "CA" is the ISO standard code for California.

The naming convention for the tags preferably includes relatively readable and long names. The disk space lost pales in comparison to the image storage. Having readable names allows human beings to manipulate documents. The readable names make the CPML DTD easier to explain to third parties.

D. The EQV Format Can Be Replaced with the CPML DTD in IPAM Server

The EQV format of the patent equivalent text files (see the patents and applications referenced above in the section entitled "Cross-Reference to Other Patents and Applications") can be replaced with the CPML DTD. Preferably, IPAM server 105 accepts XML intellectual asset documents as electronic documents.

XML intellectual asset documents are stored just as patent equivalent text files were, and are delivered to the IPAM server 105 just as the patent equivalent text files were. Changes to the IPAM server 105 include:

- IPAM server 105 has to recognize XML as a format equivalent to the EQV format and return XML intellectual asset documents upon request.
- The IPAM server 105 has a new command that requests the XML for a particular intellectual asset document.
- The domain has new data paths for passing up the XML formatted documents as it did the EQV formatted documents. Alternatively, the domain can convert the XML formatted document to an EQV formatted file before passing it to the user interface of the IPAM server 105 to save the user interface the trouble of being dual-operable, and to save the annotation subsystem some complexity.
- The user interface of the IPAM server 105 displays the document properly.
- The entire annotation subsystem can handle anchoring the annotation in an XML document rather than an image or an EQV document.

The invention includes tools that accomplish the following tasks: translate all incoming data into XML; merge disparate data for a particular document into a single XML document; track changes and version documents; produce indexes and database flatfiles from a set XML of documents; and convert XML formatted documents into EQV formatted documents for backward compatibility.

E. The CPML DTD Retains as Much Information Present in the Original Documents as Practical, Including Chemical, Table, and Mathematical Information The original structured data can be retained for future use by "escaping" the data—for example, commenting it out or wrapping it in a processing instruction—but "escaping" does not facilitate further processing. In order to process the information, it must be put into a semantic context that the processing software understands. Rather than have the processing software understand all the original formats, the original formats should be translated to a single format.

F. The CPML DTD Includes a IPAM Server Interface for Accessing Groups and Annotations via an XML Interface XML and the CPML DTD of the present invention are also useful as an output format for the IPAM server 105. XML provides a structured content format that is platform-independent. Groups, documents, and annotations can be output by IPAM server 105.

Annotations contain some optional flags and annotation segments.

Annotation segments contain a "start" anchor and an "end" anchor, and some content, which may either be embedded in the annotation or referred to by the annotation. It may also make reference to its group or owner. A possible XML format is below:

```
<Annotation guid='the annotation guid'>
    <AttorneyWorkProduct />
    <Owner xml:link='some Xpointer' />
    <AnnotationSegment guid='the annotation segment guid'>
        <Start xml:link='some Xpointer#some Xlink' />
        <End xml:link='some Xpointer#some Xlink' />
        This is the text of the annotation.
        (This particular thing's very interesting.)
    </AnnotationSegment>
    <AnnotationSegment guid='the annotation segment guid'>
        <Start xml:link='some Xpointer#some Xlink' />
        <End xml:link='some Xpointer#some Xlink' />
```

-continued

```
        <ContentLink xml:link='some Xpointer' />
    </AnnotationSegment>
</Annotation>
```

Groups contain annotations, documents, and other groups. They make reference to their parents. Annotations may be referred to, or embedded directly in the group. A possible XML format is below:

```
<Group guid='the group guid'>
    <AnnotationReference xml:link='|an annotation guid'/>
    <Annotation guid='the annotation guid'>
        <AttorneyWorkProduct />
        <Owner xml:link='|a group guid' />
    </Annotation>
    <DocumentReference xml:link='|a document guid'/>
    <DocumentReference xml:link='|a document guid'/>
    <Parents>
        <GroupReference xml:link='|a group guid'/>
        <GroupReference xml:link='|a group guid'/>
    </Parents>
    <Children>
        <GroupReference xml:link='|a group guid'/>
        <GroupReference xml:link='|a group guid'/>
        <GroupReference xml:link='|a group guid'/>
    </Children>
</Group>
```

The CPML DTD of the present invention gives this data a "life of its own". For example, someone could send an annotation to a coworker, and the coworker could view it with his e-mail reader (with the appropriate XML plug-ins to the e-mail reader). If the coworker wants the group context, he follows the "group" link, which sends the request to the WorkBench, as described in detail in the applications and patents referenced above in the section entitled "Cross-Reference to Other Patents and Applications."

G. The CPML DTD Includes a Set of XML Interfaces for Third-party Content Managers That Allows Users to Use Those Content Managers via IPAM in the Future XML can be used as a back-end interface for hooking into third party search engines and document servers. IPAM server 105 needs to use an interface to access central search servers. If that interface is in XML and is relatively general, it provides a platform-independent standard.

H. The CPML DTD provides Claims Structure Support

Embodiments of the CPML DTD has structured claims information. Claims structure includes: (1) a claim number; (2) independent claim information; (3) preambles with optional dependency clauses; and (4) a main body with many elements. The CPML DTD supports varying amounts of the structures listed above. An example CMML DTD is discussed next with reference to FIGS. 7A–7C.

IV. Example CPML DTD According to an Embodiment of the Present Invention

Figure 10F:
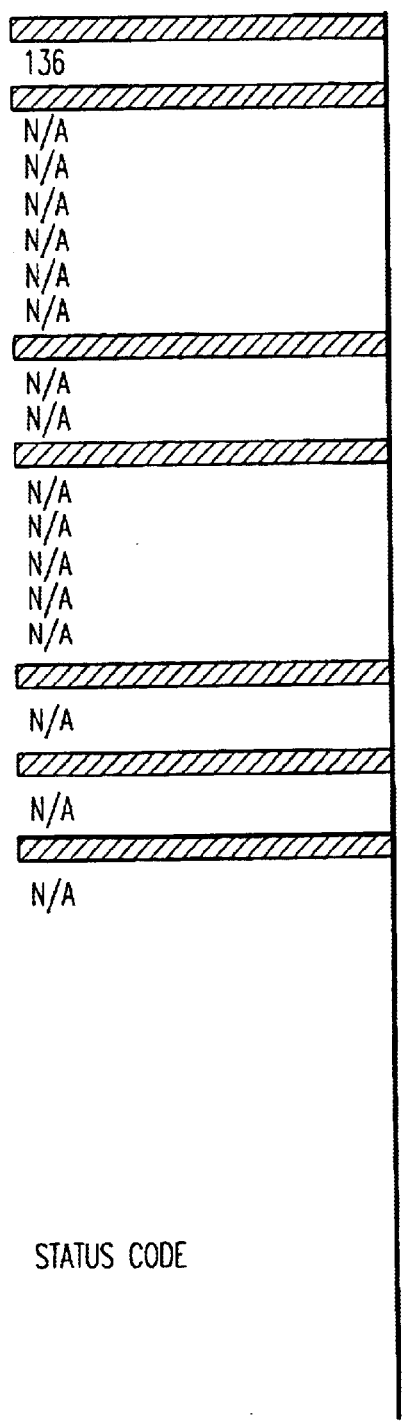

An example CPML DTD 702 is shown in FIGS. 7A–7E. The goal of CPML DTD 702, according to an embodiment of the invention, is to include text structure and bibliographic tags present in the IPAM server database and indexes. How the CPML DTD 702 and the data in the IPAM server database and indexes are related will be described below with reference to FIGS. 10G–10I. The invention is not limited to CPML DTD 702. The example of FIGS. 7A–7E is provided for illustrative purposes only, and is not limiting. Other DTDs will be apparent to persons skilled in the relevant art(s) based on the teachings contained herein.

In CPML documents, information and sections of the patent are stored in the respective tags of the CPML DTD 702.

The CPML DTD 702 shall now be described.

To aid in the understanding of the example CPML DTD 702, the following three tables are provided, including Tables 1 through 3. Table 1 illustrates some common symbols for specifying element structure in a DTD, along with their descriptions:

TABLE 1

| Symbol | Symbol Type | Description |
| --- | --- | --- |
| \| | Vertical bar | Any element named may appear; one element must appear. |
| , | Comma | Requires appearance of elements in specified order. |
| ? | Question mark | Makes it optional for an element to appear, but only one may appear. |
|  | No symbol | One, and only one element, must appear. |
| 0 | Asterisk | Allows any number of the element to appear in sequence; even zero. |
| 0 | Plus sign | Requires at least one element to appear; more may appear in sequence. |
| ( ) | Parentheses | Groups elements. |

The following Table 2 illustrates some common attribute types in a DTD, along with their descriptions:

TABLE 2

| Attribute Type | Description |
| --- | --- |
| CDATA | The attribute may contain only character data. |
| ID | The value of the attribute must be unique, identifying the element. If two attributes within a document of type ID have the same value, the parser should return an error. Note that attributes of type ID may not have default values or fixed values. |
| IDREF | The value of the attribute must refer to an ID value declared elsewhere in the document. If the value of the attribute doesn't match an ID value within the document, the parser should return an error. |
| ENTITY, ENTITIES | The value of an ENTITY attribute must correspond to the name of an external unparsed entity declared in a DTD. An ENTITIES attribute is similar but allows multiple entity names separated by whitespace. |
| NMTOKEN, NMTOKENS | The value of the attribute must be a name token much like CDATA, but the characters used in the value must be letters, digits, periods, dashes, underscores, or colons. NMTOKENS is similar but allows multiple values separated by whitespace. |
| NOTATION | The value of the attribute must refer to the name of a notation declared elsewhere in the DTD. |
| Enumerated | The value of the attribute must match one of the values listed. Values must appear in parentheses and separated by OR (\|) symbols. |
| NOTATION (enumerated) | The value of the attribute must match the name of one of the NOTATION names listed. For example, an attribute with type NOTATION (drawing \| figure) would need to have a value of "drawing" or "figure," and NOTATION declarations would need to exist for both drawing and figure. |

The final table, Table 3, illustrates attribute default values, along with their descriptions:

TABLE 3

| Attribute Default Value | Description |
| --- | --- |
| #REQUIRED | Indicates to the parser that this attribute must have a value in all instances of the element. Failure to include the attribute will result in parsing errors. |
| #IMPLIED | Allows the parser to ignore this attribute if no value is specified. |
| #FIXED value | Announces that element instances that specify that a value for this attribute must specify the listed value. If an element instance doesn't include this attribute, its value will be presumed to be the value specified. |
| defaultvalue | Provides a default value for the attribute. If the attribute is not declared explicitly in an element instance, the attribute will be assumed to have a value of defaultvalue. |

The example CPML DTD 702 preferably includes distinct sections for each distinct part of the document. Referring to FIGS. 7A and 7B, label 703 indicates an element list (ELEMENT) that are grouped together to create the CPML DTD 702. From Table I above, we know that parentheses group elements. Therefore, the elements or sections that make up "patent" include: "Bibliography," "Abstract," "UnstructuredBibliography," BriefSummaryOfInvention," "DescriptionOfDrawings," "DescriptionOfInvention," and "Claims." We also know from Table 1 that, since a comma separates each of these elements, the elements are required to appear in the specified sequence. Therefore, the "Bibliography" element is required to appear first. Next in sequence is the "Abstract" element. CPML DTD 702 shows the "abstract" element is separated from the "Bibliography" element. In another embodiment of the present invention, the "Abstract" element could be inside of the "Bibliography" element. Because there is no symbol after the "Bibliography" of the "Abstract" element, these elements must appear once, and only once.

Note that the next three elements in the sequence ("Unstructured Bibliography," Brief Summary Of Invention" and "Description Of Drawings") each end with a question mark. From Table 1, this indicates that each of these elements, while optional, may only appear once. Next in sequence is the "DescriptionOfInvention" element that is required to appear once. The four preceding elements or sections are considered to be text sections of a patent. Note that although the embodiment in FIGS. 7A–7C show four text sections, there could just as easily be five or ten or any other number.

Finally, there is a required "Claims" element that must appear once.

Still referring to FIGS. 7A and 7B, the label 704 indicates an attribute list (ATTLIST), which generally associates values for each attribute. The attributes shown include "MajorVer," "MinorVer" and "GUID." For example, the attribute "MajorVer" can have the value 0, 1, 2, etc., but must have one of the values listed. The #REQUIRED (from Table 3) is an attribute default that indicates to the parser that the attribute "MajorVer" must have a value in all instances of the element. Failure to include the attribute will result in parsing errors. The attribute "MinorVer" is defined the same way as "MajorVer." The attribute "GUID" must have a unique value identifying the element (indicated by ID for Table 2). Again, #REQUIRED indicates that "GUID" must have a value in all instances of the element.

The label 705 references a list of normalized tags. In this embodiment of the present invention, normalized tags are a common set of tags that appear in many places. These normalized tags promise a given data normalization when they appear. Normalized tags include tags for dates (Date), for publishing organizations (PubOrg), document kinds (Kind) (see the patents and applications referenced above in the section entitled "Cross-Reference to Other Patents and Applications"), numbers (Num), and countries (Cntry). More specifically, dates are always in the form YYYYMMDD, PubOrg's are only allowed to be those found in WIPO Standard 3, Kind's obey a specified naming convention, Num's are always purely numeric, and Cntry's are only allowed to be ISO-specified countries.

The label 706 references a list of common tags and entities. In this embodiment of the present invention, common tags appear in more than one place but are not normalized. This element specifies the format for text, such as paragraphs, in the CPML DTD 702.

The label 707 references a list of patent bibliographic tags. This embodiment supports different classifications of bibliographic tags: identifiers that serve to identify documents by identifiers, references to other documents, legalities, classifications, and miscellaneous information. These bibliographic classifications are organized as follows:

Bibliographic Data
  Identifiers (that is, data that serves to distinguish this document from others)
    Title
    Publication and Examining Organization (the EPO, the USPTO, etc.)
    Kind of Document (application, patent, reissue)
    Publication Number (the number of the document proper)
    Application Number
    Abstract (with or without a typical or indicative drawing)
  References to Other Documents
    Citations
    Examiner-cited citations (usually a subset of the search report citations)
    Applicant-cited citations (typically embedded in the document proper)
    Patent Family
    Parent application(s)
    Related application(s)
    Related granted patent(s)
    Foreign applications that transfer priority under the Paris
    Convention
    Priority Application
    Priority Date
    Priority Country
    PCT International Patent Applications that transfer priority under the Patent Cooperation Treaty
  Legalities
    Inventors
    Assignees
    Legal Representation of Inventors or Assignees (who, which firm, etc.)
    Patent Examiner
    Designated States
    Relevant Dates (Filing, or Application, Date; Publication
    Date; possibly Issue, or Granted, Date; and possibly Reissuance Date)
  Classifications of the Document
    Domestic
    International (international Patent Classification; usually the version of the IPC is listed as well)

These categories are used for convenience purposes only. The invention is not limited to this example.

Some embodiments of the CPML DTD may have all of these bibliographic fields, while other DTD embodiments may have subsets of the fields. In the example of FIGS. 7A–7E, the bibliographic tags are organized as follows: general information 707, identifiers 708, references to other documents 709, legalities 710 (i.e., data that reinforces the assignee's right to monopoly), classifications 711, and miscellaneous information 712.

Referring to label 707, the bibliographic tag relating to general information is shown. From Table I above, we know that parentheses group elements. We also know from Table 1 that, since a comma separates each of these elements, the elements are required to appear in the specified sequence. Therefore, the elements or sections that make up the bibliographic tag relating to general information is as follows:

Title: must appear once, and only once;
PubNo: must appear after Title, once and only once;
AppNo: must appear after PubNo, once and only once;
PatentRef*: any number of PatentRef can appear in sequence, even zero;
FilingDate: must appear in sequence, and must appear once, and only once;
IssueDate?: must appear only once after FilingDate if present, but is optional;
PublicationDate?: must appear only once in sequence if present, but is optional;
CalculatedExpirationDate?: must appear only once in sequence if present, but is optional;
Assignee*: any number of Assignees can appear in sequence, even zero;
Inventor*: any number of Inventors can appear in sequence, even zero;
Priority*: any number of references that the present patent claims priority to can appear in sequence, even zero;
DesignatedStates: must appear in sequence, and must appear once, and only once;
IPC*: any number of IPC's can appear in sequence, even zero;
USClassification*: any number of US classifications can appear in sequence, even zero;
PublicationLanguage: must appear in sequence, and must appear once, and only once;
NumClaims?: must appear only once after PublicationLanguage if present, but is optional;
NuwDrawingFages?: must appear only once in sequence if present, but is optional;
NumFigures?: must appear only once in sequence if present, but is optional; and
NumSpecPages?: must appear only once in sequence if present, but is optional.

Note that each of these elements are further defined. For instance, Title, PubNo and AppNo are further defined as referenced by label 708. For example, PubNo is required to include the normalized tags: PubOrg,. Kind, and Num (described above with reference to label 705), in sequence.

PatentRef is further defined as referenced by label 709. FilingDate, IssueDate, PublicationDate, CalculatedExpirationDate, Assignee, Inventor, Priority and DesignatedStates are each further defined as referenced by label 710.

IPC and USClassification are further defined as referenced by label 711. Referring to label 711, IPC is required to include the normalized tags: Section, Class, Subclass, Group and Subgroup. USClassification is required to include the normalized tags: USClass, USSubclass, and USSuffix.

Finally, PublicationLanguage, NumClaims, NumDrawingPages, NumFigures and NumSpecPages are further defined as referenced by label 712.

The section or element Abstract is next in CPML DTD 702. The Abstract element is referenced by label 713.

After the Abstract section, the unstructured bibliographic section, referenced by label 714 follows. The unstructured bibliographic labeled by 714 includes a text representation of all bibliographic information of a given patent in unstructured format. This information is provided to support rendering of the patent, since not all bibliographic information may be stored in structured format (in documents that support the CPML DTD 702).

Based on the teaching above, one skilled in the relevant art(s) will understand the remainder of CPML DTD 702 including: the brief summary of the invention section is referenced by label 715, the brief description of the drawings section is referenced by label 716, the detailed description of the invention section is referenced by label 717 , and the claims section is referenced by label 718.

V. Example CPML Intellectual Asset Document—U.S. Patent

FIGS. 8A–8F illustrate an example CPML intellectual asset document for a U.S. patent. The CPML intellectual asset document of FIGS. 8A–8F corresponds to the CPML DTD 702 of FIGS. 7A–7E.

VI. Example CPML Document—European Patent

The CPML DTD 702 of FIGS. 7A–7E supports all types of patent intellectual asset documents, not just U.S. patents. For example, FIGS. 9A–9G illustrate an example CPML intellectual asset document for an EP application. The CPML intellectual asset document of FIGS. 9A–9G corresponds to the CPML DTD 702 of FIGS. 7A–7E.

Figures 10J, 11:
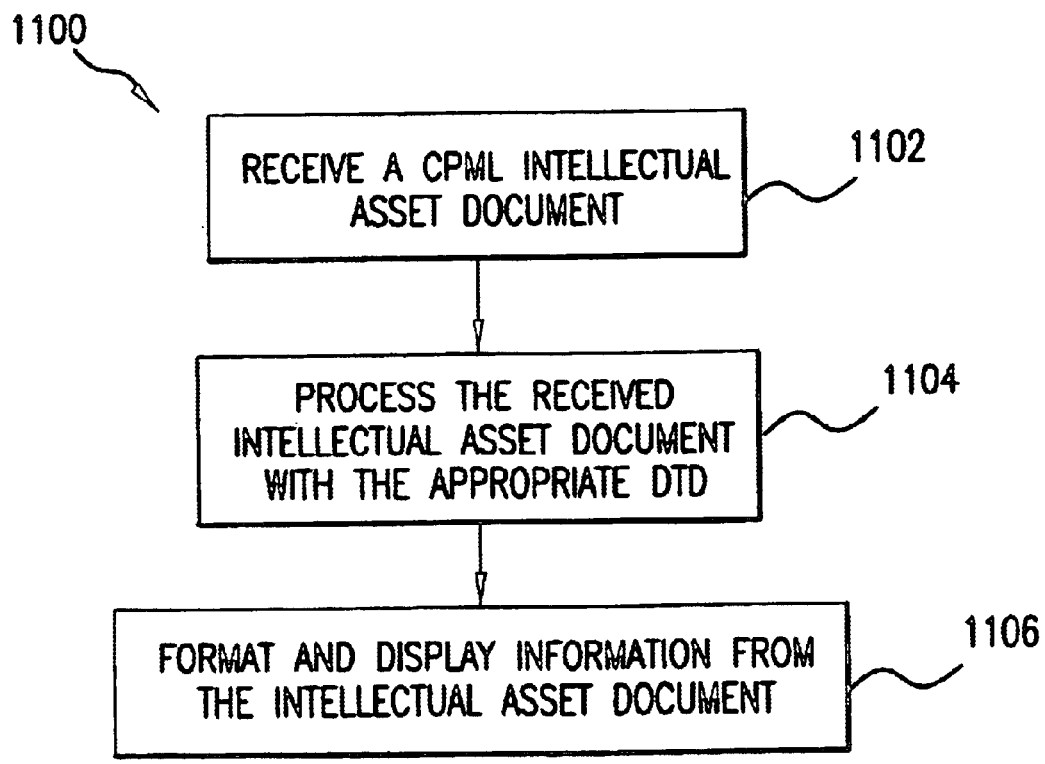
FIG. 10J illustrates the orientation of FIGS. 10A–10I according to an embodiment of the present invention.
FIG. 11 depicts one example of the high level operation of the functions of intellectual asset protocol system according to an embodiment of the present invention.

VII. Correspondence Between CPML DTD and Other Patent DTDs and Example Database Implementation FIGS. 10A–10I illustrate the mapping between the CPML DTD 702 and other patent related DTDs, such as patent-related DTDs of the U.S. Patent Office and the European Patent Office. The orientation of FIGS. 10A–10I is indicated in FIG. 10J.

The "Red Book" and "Green Book" DTDs of the USPTO are represented by columns 1004 and 1006, respectively. The DTD of the EPO/PCT is represented by columns 1008, 1010, and 1012. The CPML DTD 702 according to an embodiment is represented by columns 1014, 1016, and 1018.

FIGS. 10A–10I also illustrate the mapping between the CPML DTD 702 and fields of the IPAM server database (described in the patents and applications referenced above in the section entitled "Cross-Reference to Other Patents and Applications"), thereby indicating how data from CPML intellectual asset documents is stored in the database, and how the database is used to populate CPML intellectual asset documents.

VIII. Detailed Description of the Functions of the Intellectual Asset Protocol System of the Present Invention The function of intellectual asset protocol system 110 were introduced above with reference to FIG. 2. The functions include intellectual asset protocol function 205, intellectual asset data and processing exchange function 210, presentation function 215 and administration function 230. Each of these functions may also include one or more functions.

A. Intellectual Asset Protocol Function

The CPML DTD 702 supports formats and rules concerning the following functions performed by intellectual asset protocol function 205:

Patent and Trademark Prosecution and Workflow

Electronic Submission of Patent and Trademark Applications

Patent and Trademark Maintenance Fee Payment Tracking and Reporting

License Tracking

License Audits

License Payments

Intellectual asset Meta Data Management including (may be just includes of other DTDs) including: government issued Meta data, Derwent Data and other third parties, CML data, User Defined Intellectual Asset Meta data, etc.

Intellectual asset Data Transaction Data Exchange with ERP Systems,

Docket Systems, Licensing Systems, etc.

Reporting and Visualization of Intellectual Asset Meta Data

Relating Intellectual asset Meta data to other relevant corporate and business data Direct presentation of CPML documents to the TIBCO data exchange wire format communication layer and others.

Automatically updating clients or players with new patent information.

The intellectual asset data and processing exchange function 210 of the present invention is described next.

B. Intellectual Asset Data and Processing Exchange Function

A powerful aspect of XML and the CPML DTD 702 of the present invention (which conforms to XML) is the ability to define data exchange rules and formats for various types of transactions. See, for example, FIG. 6. There are many e-commerce data exchange initiatives that include SET, JEPI, CommerceNet, Cyber Cash, Millicent, OFX, XMLUEDI. An SGML based initiative that. is a superset of all of the above is the Open Financial Exchange protocol (OFX).

OFX is an SGML-based initiative that allows electronic commerce technologies to co-exist and interoperate. OFX aims to smooth the path towards the development of a pervasive retail trade infrastructure on the Internet. OFX supports formats and specifies rules concerning the following activities:

Offers of Sale

Agreements to Purchase

Payment

Transfer of goods and services

Delivery

Receipts

Problem Resolution

The CPML DTD 702 supports formats and rules concerning the functions performed by intellectual asset data and processing exchange function 210.

C. Presentation Function

Presentation function 215 of the present invention is responsible for specify the format of any output to the user. In an embodiment of the present invention, presentation function 215 uses cascading style sheets to format the output of CPML intellectual asset documents. Cascading style sheets, or style sheets in general, are well known in the relevant art(s). Therefore, only a brief overview will be provided next.

In general, a style sheet is a file or form that defines the layout of a document. When you fill in a style sheet, you specify such parameters as the page size, margins, and fonts. Style sheets are useful because you can use the same style sheet for many documents. For example, you could define one style sheet for patents, another for patent prosecution, and a third for trademarks, and so forth. Style sheets are also called templates.

More specifically, cascading style sheets can separate the formatting information from the body of documents, storing it separately in a STYLE element or a separate document. In addition, in-line styling, using a STYLE attribute to indicate formatting for particular elements, is also available. The "cascading" refers to the ability to combine multiple style sheets and in-line styling, simplifying the task of creating master templates and then making modifications as needed. Cascading style sheets uses the document structure as a framework, which is then annotated with formatting information and displayed (or printed, or read, or presented somehow) by an application, typically a Web browser.

D. Administration Function

Administration function 230, among other things, allows for an administrator to control which users have access to IPAM server 105, intellectual protocol system 110 and/or intellectual asset database 135.

IX. General System Operation

The manner in which users may navigate through the functional modules and features provided by intellectual asset protocol system 110 will now be described. Intellectual asset protocol system 110 (via front end system 113) may be accessible by a user directly on a desktop computer, via a World Wide Web page over the Internet (i.e., through on-line services), or accessible via an Intranet. In an alternative embodiment, intellectual asset protocol system 110 (via front end system 113) may be accessible via telephone services or the like. It should be understood that the control flows described are for example purposes only. Intellectual asset protocol system 110 of the present invention is sufficiently flexible and configurable such that users may navigate through system 1 10 in ways other than that described.

FIG. 11 depicts one example of the high level operation of the functions of intellectual asset protocol system 110. Other high level operations with be described below with reference to FIGS. 14 and 15. Referring to FIG. 11, flowchart 1100 starts at step 1102. In step 1102, the intellectual asset protocol function 205 receives (via front end system 113) a CPML intellectual asset document. Control then passes to step 1104.

In step 1104, the intellectual asset protocol function 205 processes the received intellectual asset document with the appropriate DTD in the CPML DTD 702 (FIGS. 7A–7C). Here, the CPML DTD 702 is used to parse and extract desired data from the intellectual asset document. Control then passes to step 1106.

In step 1106, the presentation function 215 is invoked to format and display information in the intellectual asset document. As described above, in an embodiment of the present invention, cascading style sheets may be used to format the output of the presentation function 215. At this point, flowchart 1100 ends.

Figure 12:
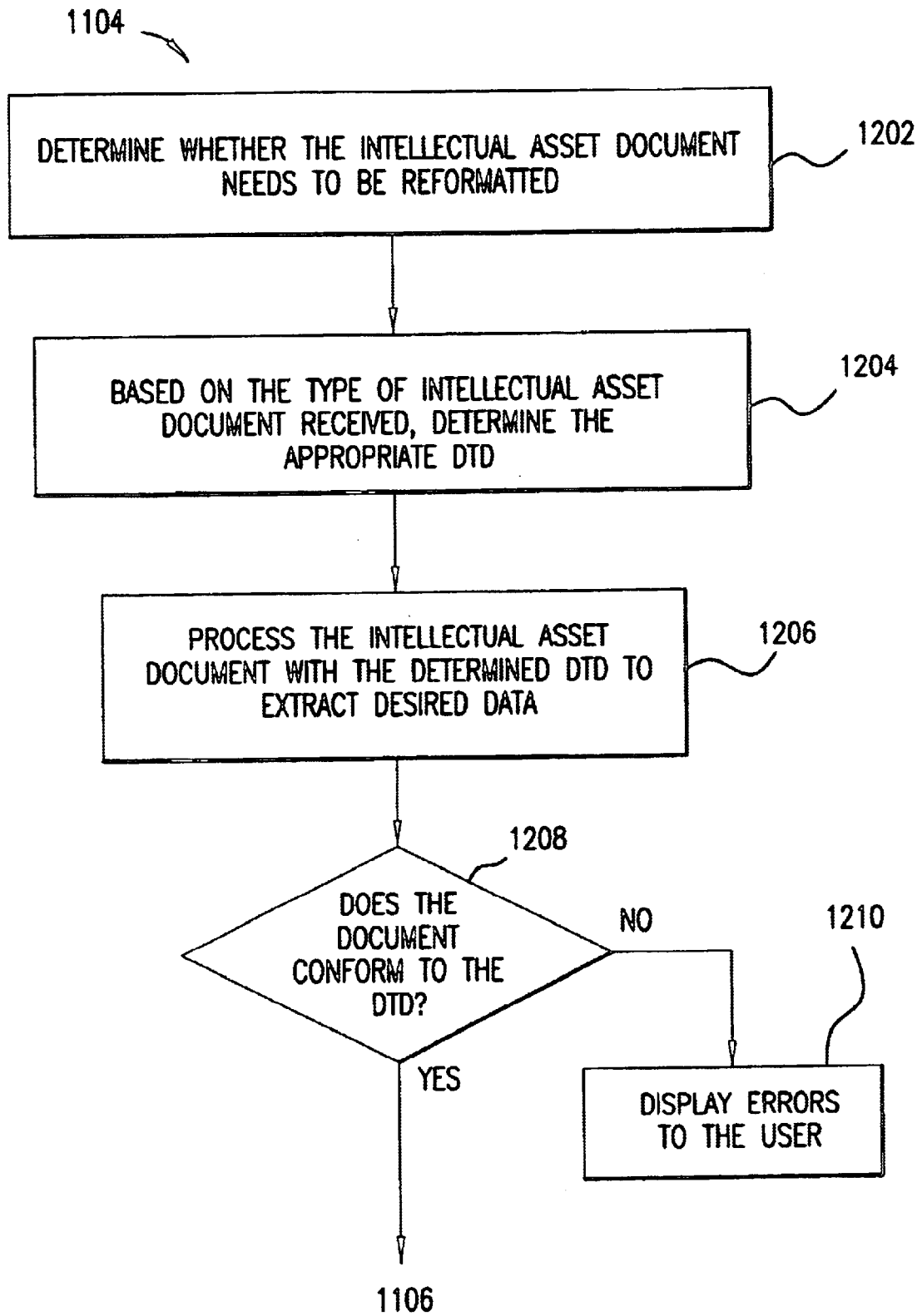
FIGS. 12 and 13 further details the steps of FIG. 11 according to an embodiment of the present invention.

Step 1104 of flowchart 1100 is further described with reference to FIG. 12. Referring to FIG. 12, control starts in step 1202. In step 1202, the intellectual asset protocol function 205 determines where the data in the intellectual asset document needs to be reformatted. If so, the intellectual data and processing exchange function 210 is invoked to reformat the data. Control then passes to step 1204.

In step 1204, based on the particular type of intellectual asset document received, the protocol function 205 refers to the CPML DTD 702 to determine As which DTD in the CPML DTD 702 to use (assuming the CPML DTD 702 contains multiple DTDs). Control then passes to step 1206.

In step 1206, the protocol function 205 refers to the CPML DTD 702 to parse and extract information from the intellectual asset document. Control then passes to step 1208.

In step 1208, it is determined whether the intellectual asset document conformed to the CPML DTD 702. If the outcome is positive, then control passes to step 1106 (FIG. 11). Otherwise, control passes to step 1210.

In step 1210, the protocol function displays parsing errors (via front end server 113) to the user. FIG. 12 ends at this point.

Figure 13:
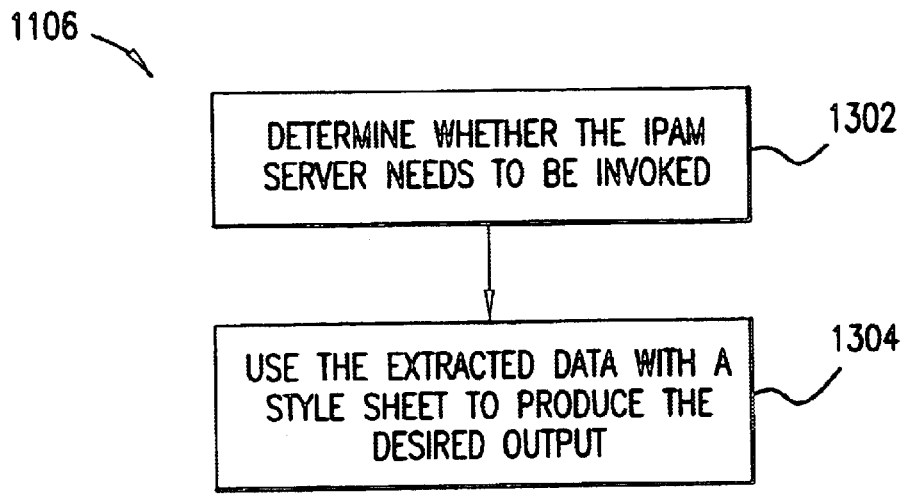

Step 1106 of flowchart 1100 is further described with reference to FIG. 13. Referring to FIG. 13, control starts in step 1302. In step 1302, the presentation function 215 determines whether the IPAM server 105 (FIG. 1) needs to be invoked to provide the requested information to the user. Control then passes to step 1304.

In step 1304, the prevention function 215 uses the extracted data and/or any data received from the IPAM server 105 with a cascading style sheet to produce the desired output for the user. It is possible to select and use different style sheets depending on the task that is being performed (so as to display different sets of information and/or to display or exchange information in formats that are useful for the task being performed). If the output desired by the user requires the data to be reformatted, then the data and processing exchange function 210 is invoked to format the data in the correct form. FIG. 13 ends at this point.

Figure 14:
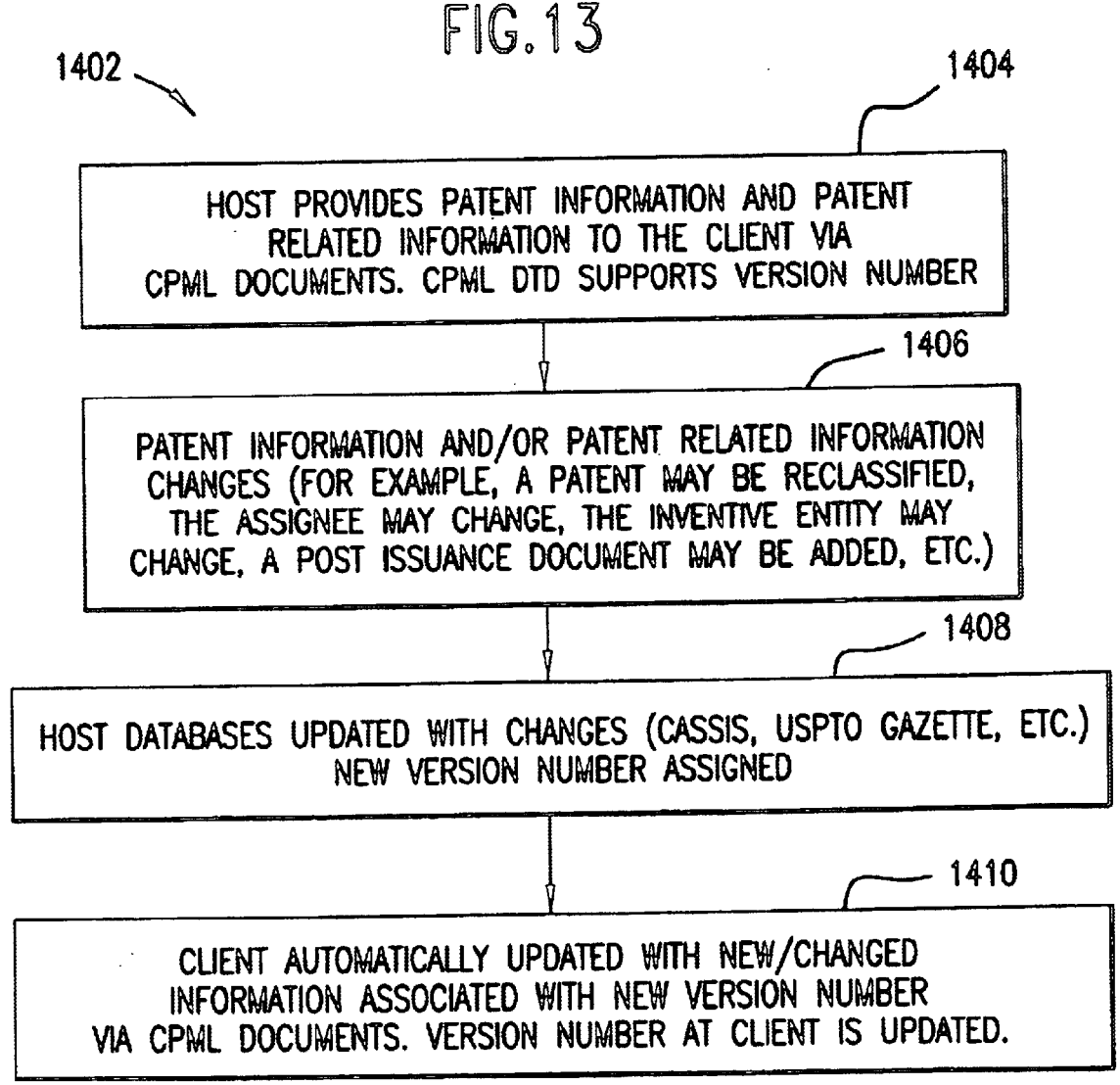
FIG. 14 illustrates the automatic update of client information according to an embodiment of the present invention.
Figure 15:
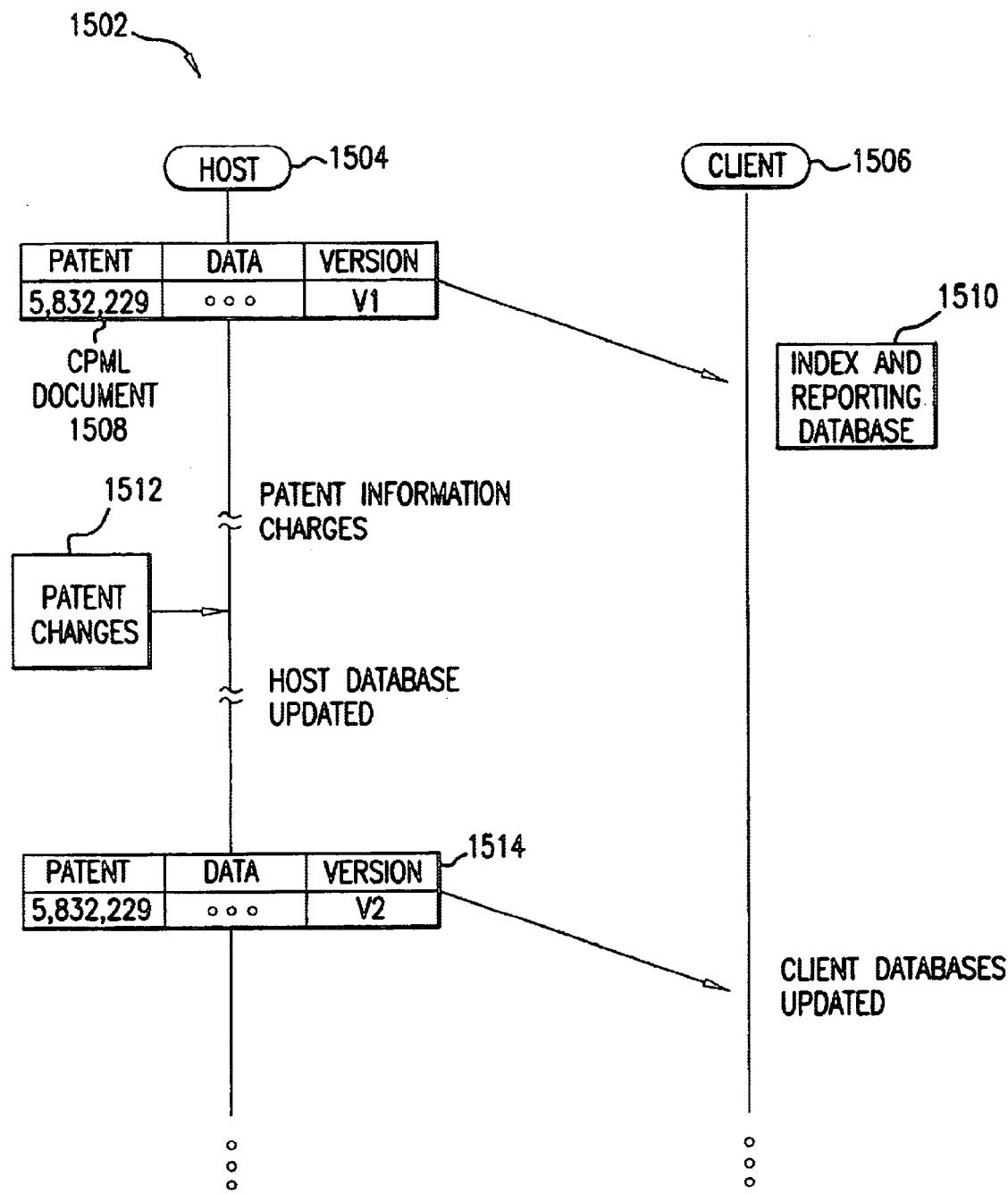
FIG. 15 is an even trace diagram that corresponds to FIG. 14 according to an embodiment of the present invention.

As stated above, FIG. 11 depicts one example of the high level operation of the functions of intellectual asset protocol system 110. FIGS. 14 and 15 depict another example of the high level operation of the functions of intellectual asset protocol system 110, which will be described next. The CPML DTD 702 supports a number of transactions. For example, embodiments of the CPML DTD 702 support automatic update of client information. This feature of the invention is illustrated in a flowchart 1402 shown in FIG. 14, and a corresponding event trace diagram 1502 shown in FIG. 15. Referring to FIG. 14, control starts at step 1404.

In step 1404, a host 1504 provides patent information and patent related information to a client 1506 via a CPML document 1508. The CPML document 1508 is a representation of U.S. Pat. No. 5,832,229. The CPML document 1508 includes information related to this patent, such as the information indicated in FIGS. 7A–7E. The CPML document 1508 also includes version information, which is part of the CPML DTD in the embodiment being discussed. In the example of FIG. 15, the version is V1. This version information is used to update the client 1506 when information changes, as described below. Control then passes to step 1406.

In step 1406, patent information and/or patent related information changes. For example, a patent may be reclassified, the assignee may change, the inventive entity may change, a post issuance document may be added, etc. These changes are represented in FIG. 15 as 1512. Control then passes to step 1408.

In step 1408, the IPAM databases in the host 1504 are modified to reflect these changes 1512. The host 1504 may receive the changes 1512 from a variety of sources, such as Cassis, USPTO Gazette, etc. A new version number (V2) is assigned to U.S. Pat. No. 5,832,229. Control then passes to step 1410.

In step 1410, the client 1506 is automatically updated with the new/changed information associated with the new version number V2. This may be implemented, for example, by checking the version number of documents represented at the client 1506. This check would indicate that the client 1506 had version V1 of U.S. Pat. No. 5,832,229. The host 1504 would know that the current version of the document was V2. Accordingly, the host 1504 would send V2 of U.S.

Pat. No. 5,832,229 to the client as CPML document 1514. The new CPML document 1514 would be used at the client 1506 to automatically update its version of U.S. Pat. No. 5,832,229. Flowchart 1402 in FIG. 14 ends at this point.

X. Inputting Data From XML and Non-XML Documents

Figure 16:
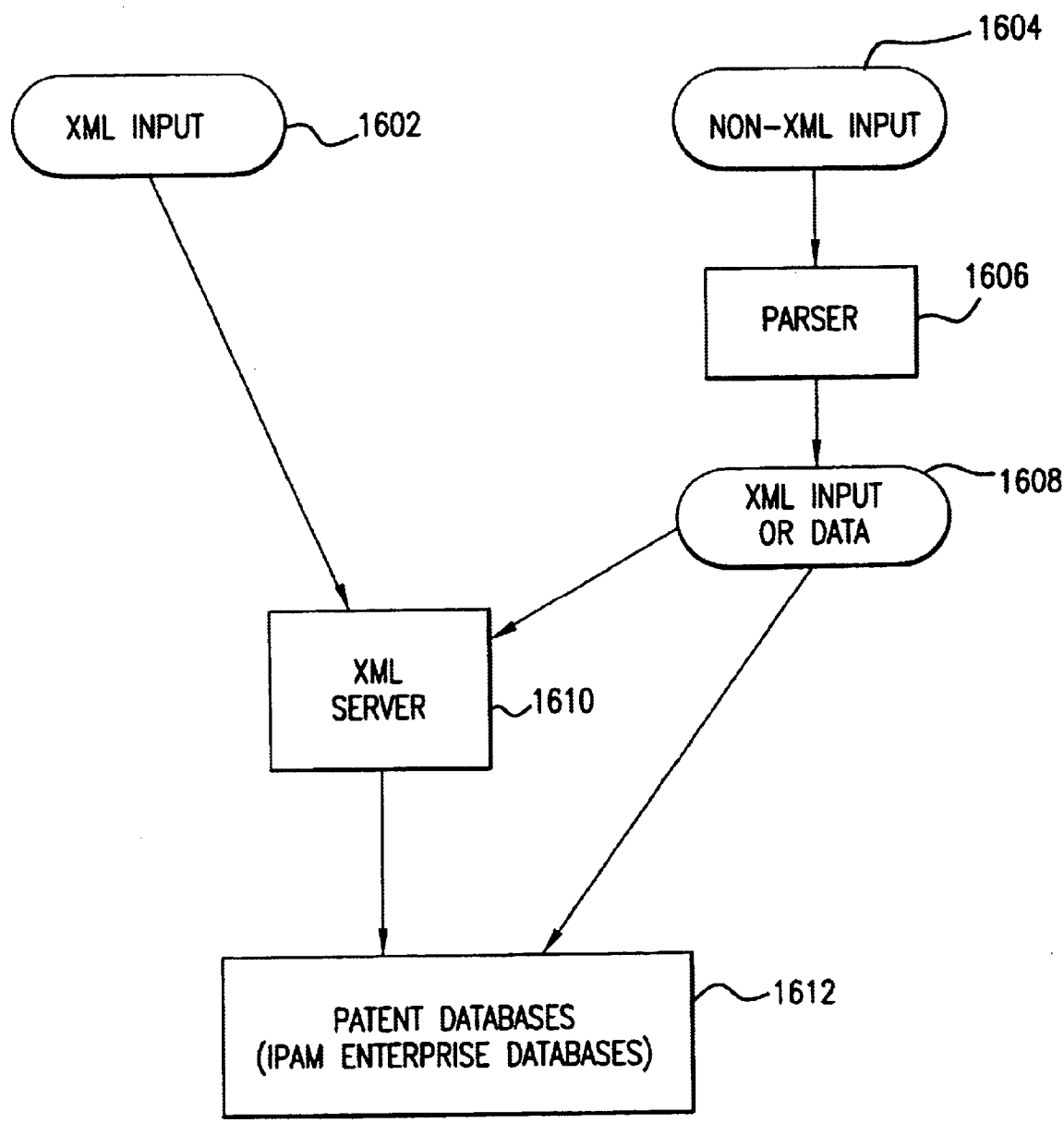
FIG. 16 illustrates how the IPAM server operates with X documents and non-XML (e.g. EQV) documents according to an embodiment of the present invention.

As mentioned above, IPAM server 105 can operate with XML documents and non-XML (e.g. EQV) documents. This is illustrated, for example, in FIG. 16.

An XML server 1610 receives XML input 1602, such as XML documents. The XML server 1610 automatically extracts structured information from the XML input 1602, and stores the structured information in the IPAM Enterprise databases 1612. There are commercially available XML servers available today, such as EXCELON. Any such XML servers can be used with the present invention.

The invention can also work with non-XML data. A parser 1606 receives non-XML input 1604, which may be a non-XML document. The non-XML input 1604 is formatted in some manner. The parser 1606 knows the format of the non-XML input 1604, either by preprogramming or on-the-fly analysis. The parser 1606 extracts information from the non-XML input 1604 and generates XML documents or data. In the case where XML documents are generated, the documents are sent to the XML server 1610 for processing. In the case where data is generated, the data is stored in the IPAM/Enterprise databases 1612.

XI. Electronic Document Order and Download DTD

As noted above, the CPML DTD 702 (FIGS. 7A–7E) supports electronic data exchange/transfer and IP-related transactions. See, for example, FIG. 6. For example, and without limitation, the invention supports an electronic document order and download protocol DTD, an example of which is shown in FIGS. 17A–17C. This DTD can be used to electronically order a document, track the order, and fill out the order. The DTD of FIGS. 17A–17C can be a part of the CPML DTD 702, or can be separate from the CPML DTD 702.

XII. Alternative Embodiment of the Intellectual Asset Protocol of the Present Invention—SPML (SmartPatents Markup Language)

The invention is directed to alternative patent markup language embodiments. One such alternative embodiment is called SPML (SmartPatents Markup Language).

The format of CPML documents is specified by the CPML DTD 702 (FIGS. 7A–7E). In contrast, the format of SPML documents is specified by SPML-specific processing (i.e., computer programs that process SPML documents). The end effect is generally the same.

The translation from DTD-specified documents to processing-specified documents, and vice versa, will be apparent to persons skilled in the relevant art(s) based on the teachings contained herein. For example, the translation from the processing of SPML to a DTD will be apparent to persons skilled in the relevant art(s) based on the herein teachings. The general format of a SPML file contains a document header, bibliographic data, and formatted document text. Prior to discussing the details of the SPML of the present invention, an example embodiment of a model used for the SPML will be described.

Figure 18A:
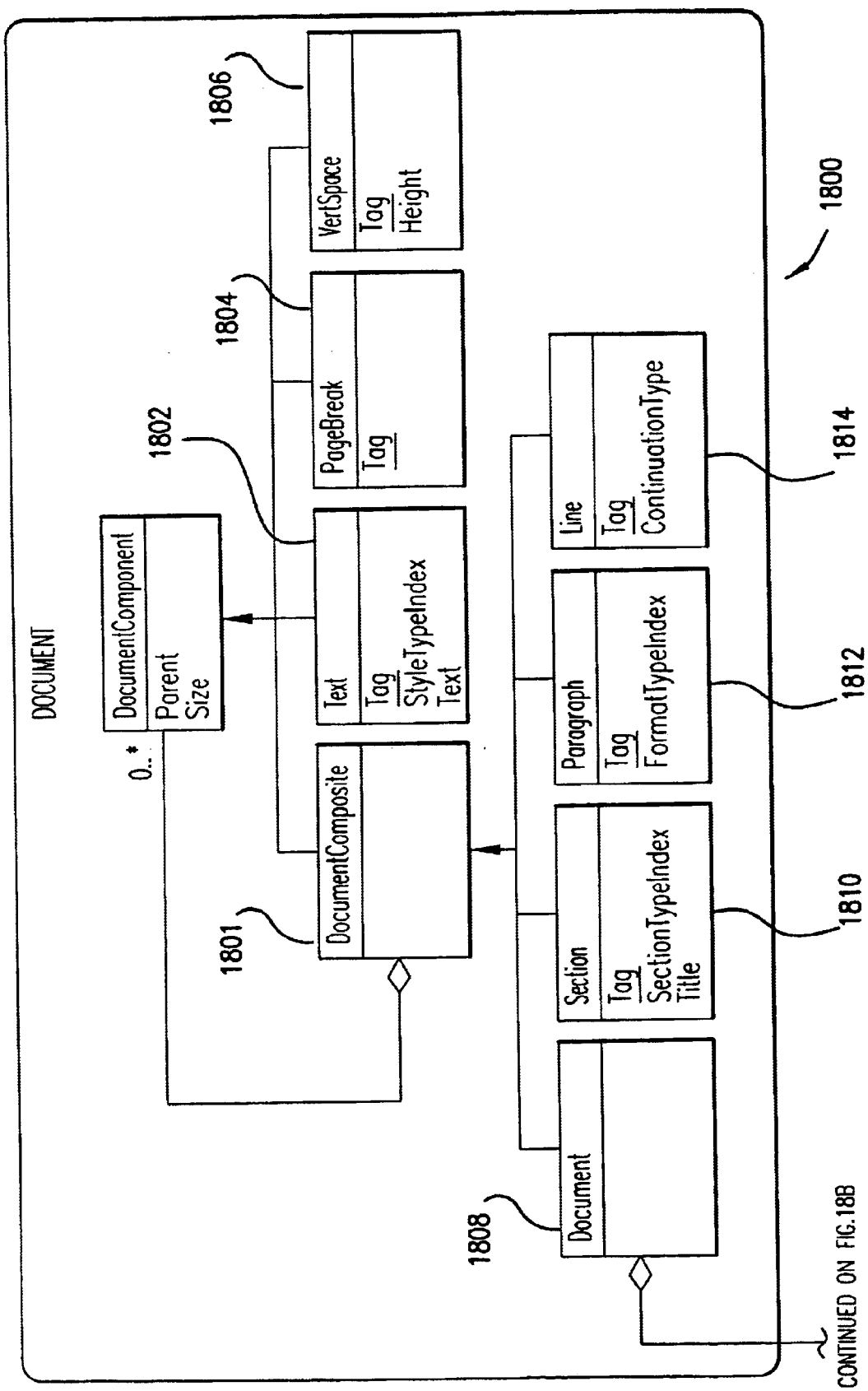
FIGS. 18A and 18B illustrate a model used for the SPML of the present invention according to an embodiment of the present invention.
Figure 18B:
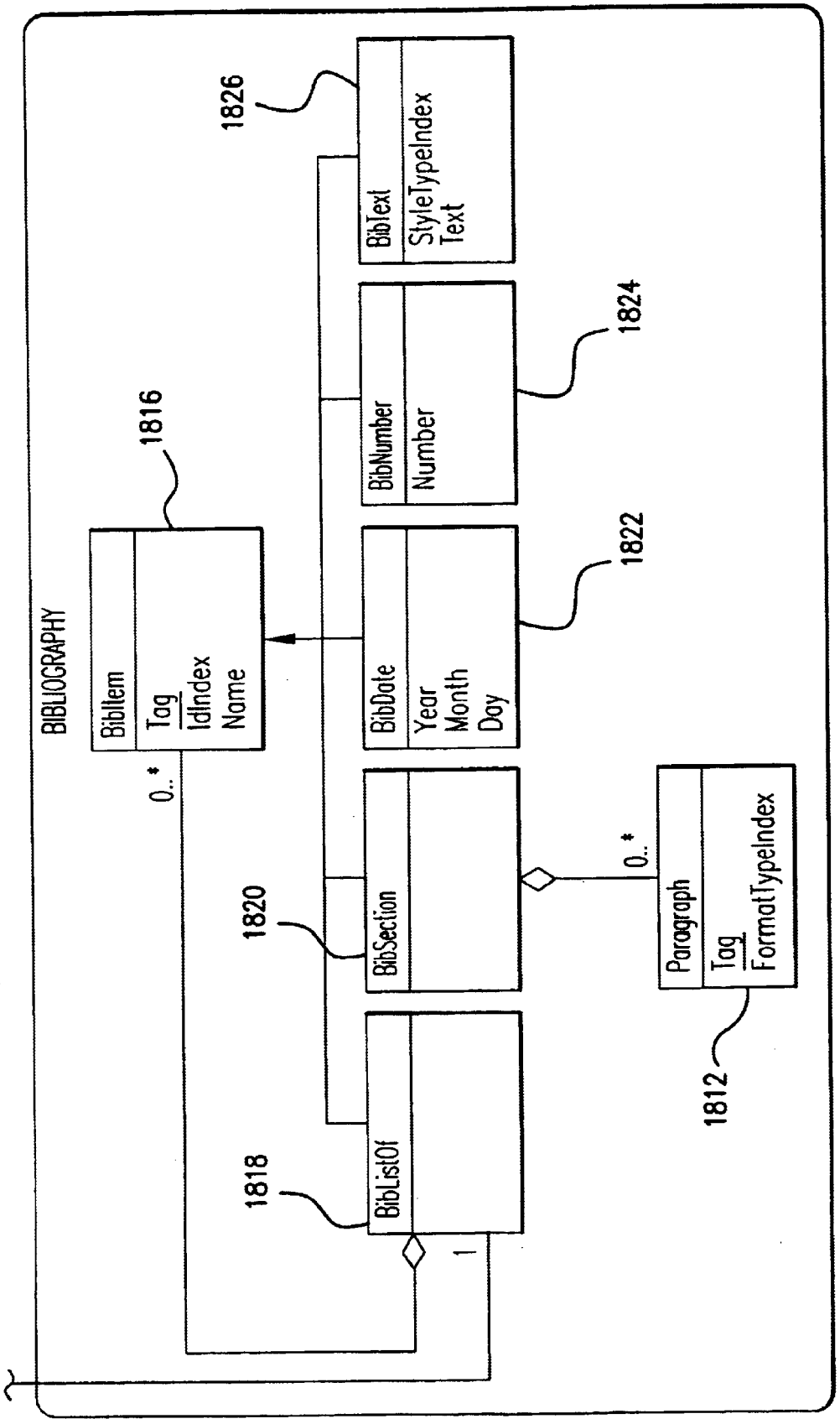

FIGS. 18A and 18B illustrate an example embodiment of a model 1800 used for the SPML of the present invention. Objects in model 1800 are either referred to as a container or a leaf. Containers can contain leafs, or containers can contain more containers. Therefore, each container limits or restricts the types of objects (e.g., containers or leafs) that can be contained in them. Referring to FIGS. 18A and 18B, containers consist of Document 1808, Section 1810, Paragraph 1812 and Line 1814. Leafs consist of DocumentComposite 1801, Text 1802, PageBreak 1804, VertSpace 1806, BibItem 1816, BibListOf 1818, BibSection 1820, BibDate 1822, BibNumber 1824, and BibText 1826. How each of the containers and leafs are defined is discussed next.

As stated above, the general format of a SPML file contains, for example, a document header, bibliographic data, and formatted document text. Referring again to FIG. 18, document 1808 is used to model the document header. BibItem 1816, BibListOf 1818, BibSection 1820, BibDate 1822, BibNumber 1824, and BibText 1826 is used to model the bibliographic data. Finally, Section 1810, Paragraph 1812, Line 1814, Text 1802, PageBreak 1804, VertSpace 1806 are used to model the formatted document text. Each of these are discussed in detail below.

It is noted that the invention is not limited to these elements. The elements and configurations described herein are provided for example purposes only. Other elements and configurations will be apparent to persons skilled in the art based on the herein teachings.

A. Document Header of the SPML File

The first line in the document header is a tag that denotes the document type as SPML. This tag is: "spDoc" for the default document type of patent.

The second line in the document header is the major version number of the SPML contained in the file.

The third line of the document header is the minor version number of the SPML contained in the file. The major and mine version number may be used in the document builder to swap in the correct SPML parser. Checksum and file size is not added to the header if it is desirable to edit the raw SPML by hand at a later time.

B. Bibliographic Data of the SPML File

The bibliographic data section may contain, but is not limited to, the following items: a string of text (related to BibText 1826), an integer number (related to BibNumber 1824), a date (related to BibDate 1822), a section of formatted text (related to BibSection 1820), and a list of any of these mentioned bibliographic items (related to BibListOf 1818). Each of these are described in more detail below.

1. BibText

The format of data in BibText 1826 is:

T9, Inventor least Name, 1, Smith.

The first comma delimited field is the tag and contains the following information:

1) The "T" identifies the line as containing a BibTextItem.
2) The number following the tag is a type id that tells what kind of text item it is. These types are mapped to the known patent text elements (e.g., the text type id of "1" is a text item that is the patent number, and the text type id of "9" is a text item that is an inventor first name), and user define bibliographic text items will be given a unique type id.

The second comma delimited field is the Name and contains the following information:

1) The name given to the text item (e.g., "Patent Number" or "Inventor Last Name"). This field will most likely be empty for known patent types (the information can be determined from the type id) and contain data for user defined bibliographic text items.

The third comma delimited field is the Style Index and contains the following information:

1) The index of style to be used when displaying the text item (e.g., a style index of "1" means that the text item is to be displayed in normal 9 point Times Roman).

The fourth comma delimited field is the data and contains the following information:

1) A string containing the actual text data.
  2. BibNumber
  The format of data in BibNumber 1824 is:
  N5, Number of claims, 16.
The first comma delimited field is the tag and contains the following information:
1) The "N" identifies the line as containing a BibNumber.
2) The number following the tag is a type id that tells what kind of number item it is. These types are mapped to the known patent number elements (e.g., the number type id of "5" is a number item that is the number of claims the patent has), and user defined bibliographic number items will be given a unique type id.
The second comma delimited field is the Name and contains the following information:
1) The name given to the number item (e.g., "Number of claims"). This field will most likely be empty for defined bibliographic text items.
The third comma delimited field is the data and contains the following information:
1) An integer value that is the data.
  3. BibDate
  The format of data in BibDate 1822 is:
  D1, Application date, Jul. 11, 1985.
The first comma delimited field is the tag and contains the following information:
1) The "D" identifies the line as containing a BibDate.
2) The number following the tag is a type id that tells what kind of date item it is. These types are mapped to the known patent date elements (e.g., the date type id of "1" is a date item that is the application date of the patent), and user defined bibliographic date items will be given a unique type id.
The second comma delimited field is the Name and contains the following information:
1) The name given to the date item (e.g., "Application date"). This field will most likely be empty for known patent types (the information can be determined from the type id) and contain data for user defined bibliographic text items.
The third comma delimited field is the data and contains the following information:
1) A month, day and year separated by spaces.
  4. BibSection
  The format of data in a Section item (e.g., BibSection 1820) is similar to the formatted text sections of the document text. Only the notable differences will be given here to avoid difficulties in maintaining the same information in two places. The tag for a bibliographic section is "B" instead of "S".
  5. BibListOf
  The format of data in BibListOf 1818 item is:
  L1, BibliographicData
  bib items (including other lists)
  ~
The first common delimited field is the tag and contains the following information:
1) The "L" identifies the line as starting a BibListOf.
2) The number following the tag is a type id that tells what kind of list item it is. These types are mapped to the known patent list elements (e.g., the list type id of "2" is a list of inventor list items. The type id of "3" is a list of all of the items that make up an inventor such as a BibText item for the first name and another for the last name), and user defined bibliographic list items will be given a unique type id. Note that the list type if of "1" is a special type of list that all documents must have this is the list that contains all other bibliographic items that the document has.

The second comma delimited field is the Name and contains the follow information:
1) The name given to the list item (e.g., "Bibliographic Data", "Inventor list", or "Inventor item"). This field will most likely be empty for known patent types (the information can be determined from the type id) and contain data for user defined bibliographic text items.
The final part of the data in BibListOf 1818 is the end tag:
1) Since a list can be nested, an end tag is needed to mark the end of a list. This end tag is "~" on a line by itself. The end tag marks the end of the most recent list. For example:
  L1, Bibliographic Data
  L2, Inventor list
  ~//this ends the Inventor list
  ~//this ends the Bibliographic Data list
  C. Formatted Document Text Data of the SPML File
  The formatted document text data section may contain, but is not limited to, the following items: sections containing one or more paragraphs (related to Section 1810), paragraphs containing one or more lines (related to Paragraph 1812), lines containing one or more text sequences (related to Line 1814), text sequences containing one or more characters (related to Text 1802), page breaks (related to PageBreak 1804), vertical spaces (related to VertSpace 1806), and special characters (not shown in FIG. 18). Each of these are described in more detail below.
    1. Section
    The format of data in Section 1810 is:
    S1, The first section of the document
    paragraph data
The first comma delimited field is the tag and contains the following information:
1) The "S" identifies the line as starting a Section.
2) The number following the tag is a type id that tells what kind of section it is. These types are mapped to the known patent sections, and user defined sections items will be given a unique type id.
The second comma delimited field is the Name and contains the following information:
1) The name given to the Section (e.g., "Summary of the Invention"). This field will most likely be empty for known patent types (the information can be determined from the type id) and contain data for user defined bibliographic text items.
2) There is no need for an end tag since sections cannot be nested.
    2. Paragraph
    The format of data in Paragraph 1812 is:
    P1
    line data
The first comma delimited field is the tag and contains the following information:
1) The "P" identifies the line as starting a paragraph.
2) The number following the tag is a type id that tells what kind of indentation to use when displaying the paragraph. These types are mapped to the known patent indentation styles, and user defined section items will be given a unique type id. User defined indentation styles will most likely be defined in the header of this document.
3) There is no need for an end tag since sections cannot be nested.
    3. Line
    The format of data in Line 1814 is simply the text items that make up the line of text on a single line in the file:

<text data><text data><text data>

There is no need for a start tag or end tag because the line in the SPML file itself is the market for when a line begins and ends.

4. Text

The format of data in Text 1802 is:

<T0, This is a sample of some text.>

The first comma delimited field is the tag and contains the following information:
1) The "<T" identifies the line as starting text.
2) The number following the tag is a type id that tells how the text is to be displayed. These types are mapped to the known patent text styles, and user defined styles will be given a unique type id. User defined text styles (e.g., bold italics 15 point Arial) will most likely be defined in the header of the document.

The second comma delimited field is the data and contains the following information:
1) A string containing the actual text data.
2) The end of the string of data is marked by the tag, ">". If the character ">" needs to be part of the text data it should be represented as a special character ("~>~").

5. PageBreak

The format of data in PageBreak 1804 is:

<G>

No additional information is needed to represent a page break.

6. VertSpace

The format of data in VertSpace 1806 is:

<Vheight>

This contains two parts:
1) A "V" to specify that this is a vertical space tag.
2) A number specifying a height. One height unit will be equivalent to half the height of a line of text.

7. SpecialChar

The format for a special character in a text sequence is:

~DELTA~

The name field of the special character is surrounded by "~" and contains the following information:
1) A string containing a lookup value to an array that maps special character names to special character codes.

An example format of formatted document text, according to an embodiment, of the present invention is as follows:

S1, The first section of the document
P1
<T, This is a sample of some text.>
<T, This is a sample of some text.>
<T, This is a sample of some text.>
P1
<T0 This is a sample of some text.>
<T0, This><T1, is a sample><T0, of some><T2, text with style changes.>
<T0, This is a sample of some text.>
P5
<T0, This is a sample of some text.>
<T0, This is a sample of a special character,~DELTA~, in the middle of a text sequence.>
<T0, This is a sample of some text.>
<T0, This is a sample of some text.>
S4, The second section of the document
P2
<T0, This is a sample of some text.>
<T0, This is a sample of some text.>
P1
<T0, This is a sample of some text.>
<T0, This><T1, is a sample><T0, of some><T2, text.>
<T0, This is a sample of some text.>

D. Streaming Mechanisms of the Present Invention

Streaming is a technique for transferring data such that it can be processed as a steady and continuous stream. Streaming technologies are becoming increasingly important with the growth of the Internet 120 (FIG. 1) because most users (or clients) do not have fast enough access to download large multimedia files quickly. With streaming, the client browser or plug-in can start displaying the data before the entire file has been transmitted.

For streaming to work, the client side receiving the data must be able to collect the data and send it as a steady stream to the application that is processing the data and converting it to sound or pictures. This means that if the streaming client receives the data more quickly than required, it needs to save the excess data in a buffer. If the data doesn't come quickly enough, however, the presentation of the data will not be smooth. The present invention provides two different streaming techniques that are used in conjunction with the presentation function 215 (FIG. 2).

As stated above, the presentation function 215 of the present invention is responsible for specifying the format of any output to the user. In an embodiment of the present invention, presentation function 215 uses cascading style sheets to format the output of SPML intellectual asset documents. Cascading style sheets provide a CLASS attribute. Developers can use this class attribute to reflect categories of content and not just formatting. The present invention combines the CLASS attribute of cascading style sheets and the streaming technique to provide two streaming mechanisms including: a template based streaming mechanism and a visitation based steaming mechanism. Both mechanisms address how to get the SPML files into, and then back out of, memory. The template based streaming mechanism will be described first with reference to FIG. 19. Next, the visitation based steaming mechanism of the present invention will be described with reference to FIG. 20.

Figure 19:
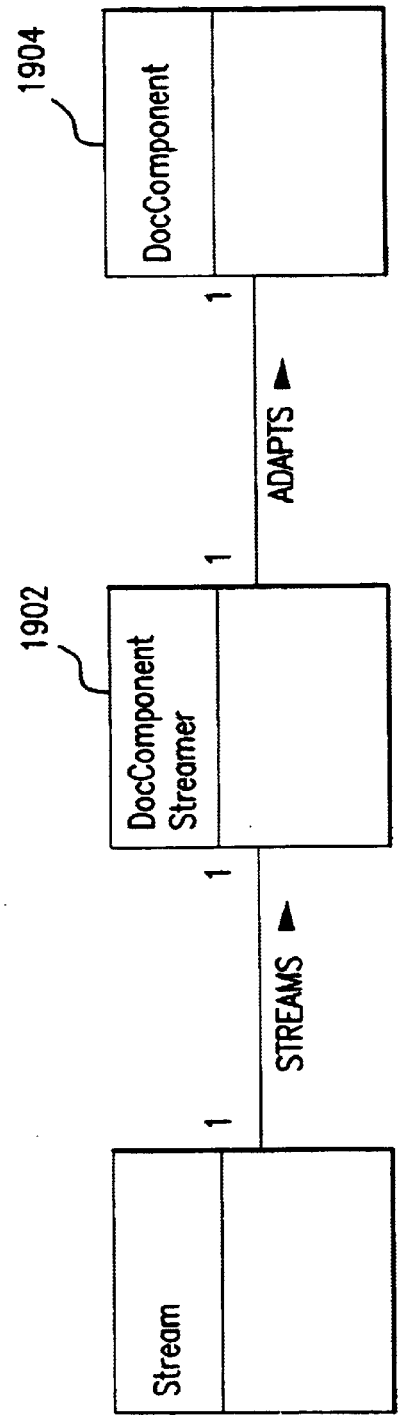
FIG. 19 illustrates the template based streaming mechanism of the present invention according to an embodiment of the present invention.

Referring to FIG. 19, the class of a DocComponent-Streamer 1902 acts as an adapter to the class of a DocComponent 1904 (also see FIG. 18) so that the streaming behavior is moved out of the class of the DocComponent 1904 and into the class of the DocComponentStreamer 1902. This allows the DocComponent 1904 to be streamed in several different ways based on the type of DocComponentStreamer 1902 used to adapt the DocComponent 1904. Sample code is as follows:

DocComponentStreamer streamer (DocComponent);

cout <<streamer;

For the template based streaming mechanism of the present invention, macros may be written for every different type of streaming desired that acts like an adapter streamer for every type of document component that needs to be written.

Figure 20:
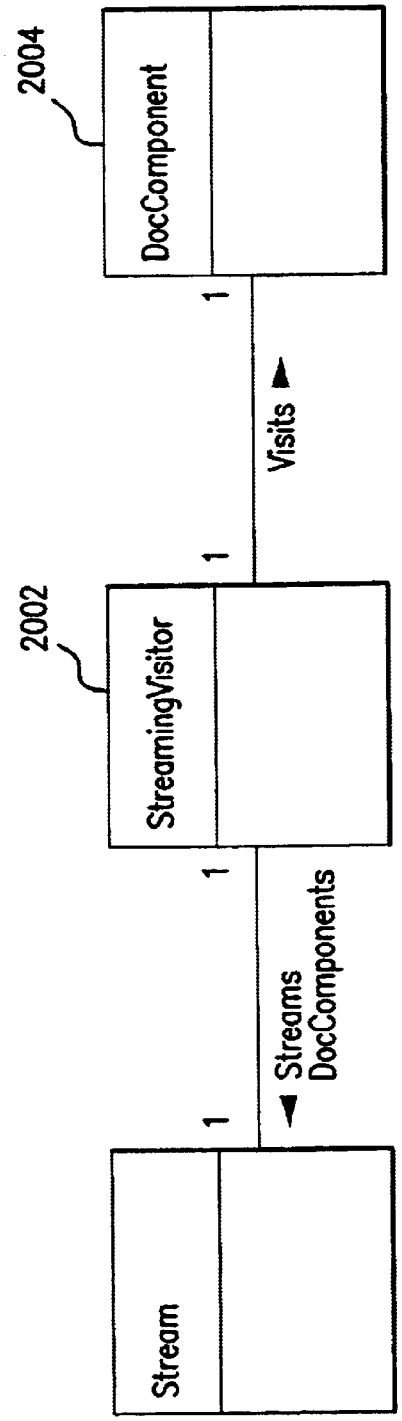
FIG. 20 illustrates the visitation based steaming mechanism of the present invention according to an embodiment of the present invention.

Referring to FIG. 20, the visitation based steaming mechanism of the present invention will now be described. The class of a Streaming visitor 2002 is accepted by the a virtual method of the class of a DocComponent 2004 (also see FIG. 18). This allows the visitor to stream the correct information without having to cast the DocComponent 2004 to a derived type. All of the streaming behavior is moved out of the class of the DocComponent 2004 and into the class of the StreamingVistor 2002. This allow s the DocComponent 2004 to be streamed in several different ways based on the type of visitor used. Sample code is as follows:

StreamingVistor visitor (cout);

component.Accept (visitor);

E. Adapter Classes of the Present Invention

Figure 21:
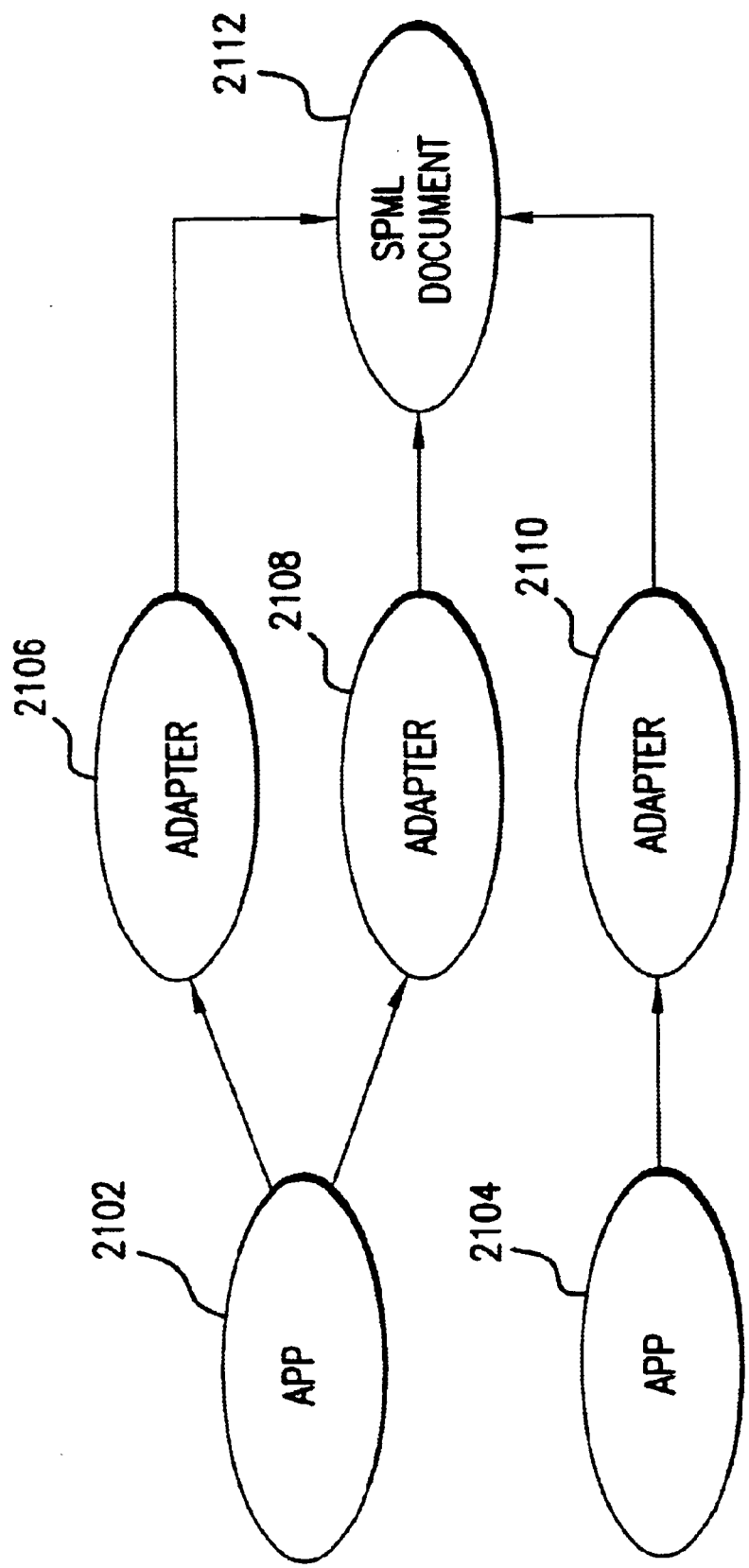
FIG. 21 illustrates an abstract view of how applications may use different Ad. adapters in order to work differently with the same SPML document of the present invention according to an embodiment of the present invention.

The SPML document of an embodiment of the present invention may be adapted to different roles through the use of adapter classes. The use of adapter classes provides many advantages including: allows different ways of working with a SPML document to be encapsulated; different interfaces can be added to the present invention without affecting other existing interfaces; prevents a bloated document interface; and allows client code to choose the role that the SPML document plays, and how it can be used. FIG. 21 illustrates an abstract view of how applications may use different adapters in order to work differently with the same SPML document.

Referring to FIG. 21, an application 2102 utilizes an adapter 2106 to work with a SPML document 2112 in one way and utilizes an adapter 2108 to work with the same SPML document 2112 in a different way. An application 2104 utilizes an adapter 2110 to work with the same SPML document 2112 as application 2102 in yet a different way. A concrete view of how applications may use different adapters in order to work differently with the same SPML document will be described next.

Figure 22:
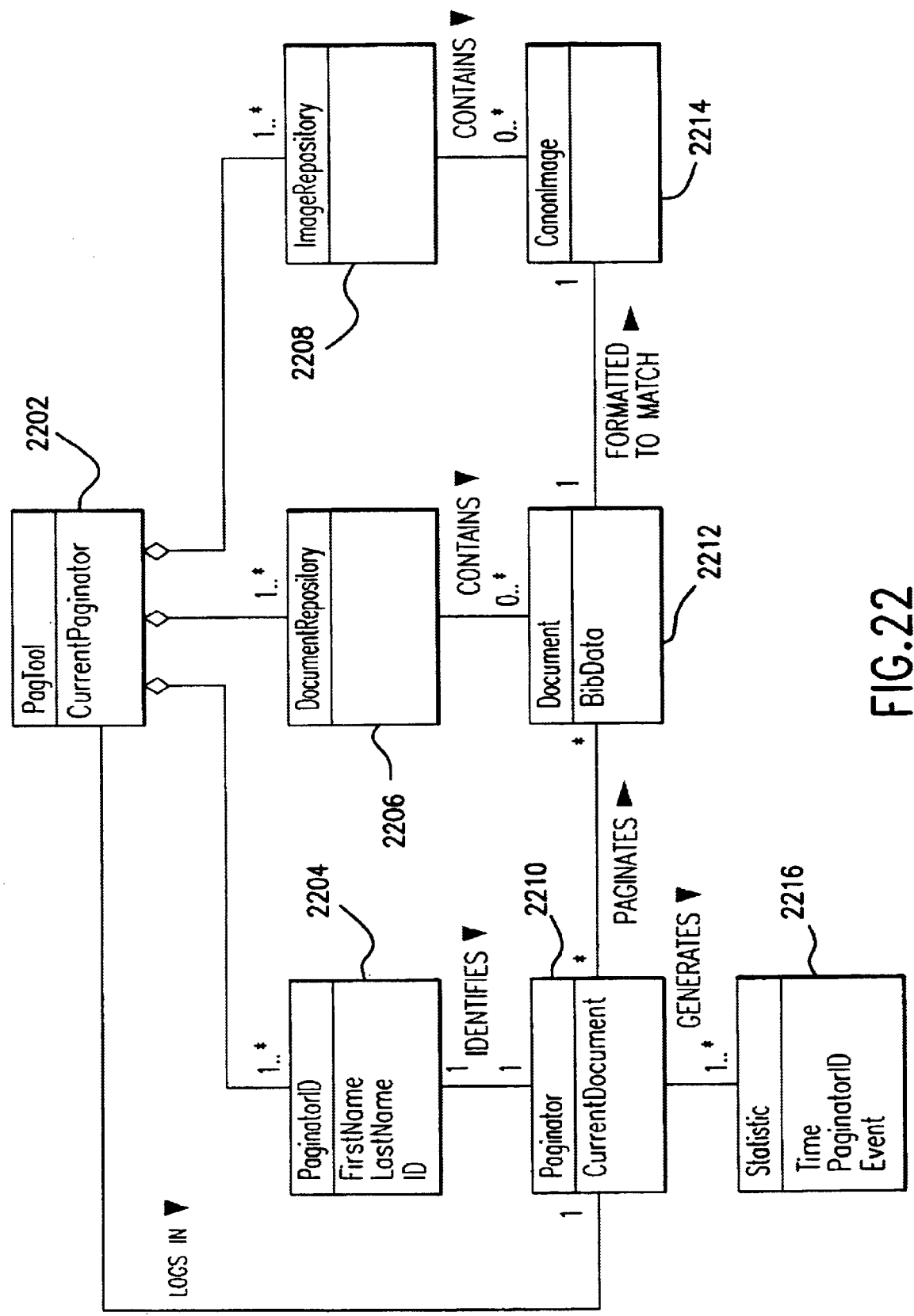
FIG. 22 illustrates a concrete view of how applications may use different adapters in order to work differently with the same SPML document of the present invention according to an embodiment of the present invention.

FIG. 22 is an example concrete view of how applications may use different adapters in order to work differently with the same SPML document. In FIG. 22, a PagTool 2202, a PaginatorID 2204, a DocumentRepository 2206, an ImageRepository 2208, a Paginator 2210, a Document 2212, a Canonimage 2214 and a Statistic 2216 are shown. PagTool 2202 acts as the facade for the domain in the absence of a paginator. PaginatorID identifies a paginator. The ID is used to log on and determine who generated what statistics. DocumentRepository 2206 identifies a location where SPML files or documents can be found. Imagerepository 2208 identifies a location where CAN files can be found. Statistic 2216 contains information about when a paginator logs on, logs off, opens a file, saves a file, or completes a pagination of a file. Canonlmage 2214 represents the image data that serves as the basis for formatting information. Document 2212 contains the text data with formatting information. This is a text version of the Canonlmage 2214. Finally, Paginator 2210 modifies the formatting information of a document. Paginator 2210 can insert and/or remove page breaks and line breaks, edit figure references, and edit the number of bib pages.

XIII. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A system for enforcing the standardization of data exchange for intellectual asset data objects, comprising:
   a database having stored therein at least one intellectual asset protocol, wherein said at least one intellectual asset protocol defines at least one data exchange set of rules and formats for a type of intellectual asset data object; and
   at least one engine, wherein said at least one engine determines whether an intellectual asset data object of said type conforms to said intellectual asset protocol.

2. The system according to claim 1, wherein said type of said intellectual asset data object is selected from the group consisting of a patent, a patent application, a trademark, a trademark application, a copyright, a trade secret, a license agreement, and a joint venture agreement.

3. The system according to claim 1, wherein said database is accessible through the Internet.

4. The system according to claim 1, wherein said database is relational.

5. The system according to claim 1, wherein said database supports hypertext references.

6. The system according to claim 1, wherein objects within said protocol conform to at least one Extended Markup Language (XML) Document Type Definition (DTD).

7. The system according to claim 6, wherein said DTD comprises a union of structured bibliographic data of said intellectual asset data objects.

8. The system according to claim 1, wherein said system further comprises an input for receiving intellectual asset data objects, a format of said input intellectual asset data objects being normalized for entry into said database.

9. The system according to claim 1, wherein said system further comprises an output for presenting information from said intellectual asset data objects, said information from said input intellectual asset data objects being formatted according to a DTD.

10. A system for enforcing the standardization of data exchange for intellectual asset data objects, comprising:
    a database having stored therein at least one Markup Language Data Type Definition, wherein said at least one Data Type Definition defines at least one data exchange set of rules and formats for a type of intellectual asset data object;
    at least one input engine, for receiving an intellectual asset data object and ensuring that it is normalized according to a Data Type Definition; and
    at least one output engine, for presenting an intellectual asset data object according to an output Data Type Definition format.

11. The system according to claim 10, wherein said Markup Language comprises SGML.

12. The system according to claim 10, wherein said Markup Language comprises XML.

13. The system according to claim 10, wherein said type of said intellectual asset data object is selected from the group consisting of a patent, a patent application, a trademark, a trademark application, a copyright, a trade secret, a license agreement, and a joint venture agreement.

14. The system according to claim 10, wherein said database is accessible through the Internet.

15. The system according to claim 10, wherein said database is relational.

16. The system according to claim 10, wherein said database supports hypertext references.

17. The system according to claim 10, wherein said input Document Type Definition comprises a union of structured bibliographic data of said intellectual asset data objects.

18. A data exchange method, comprising the steps of:
    receiving a plurality of intellectual asset data objects;
    normalizing the intellectual asset data objects according to a markup language document type definition;
    storing the normalized intellectual asset data objects in a relational database;
    receiving a query against the relational database; and
    presenting intellectual asset data objects according to an output markup language document type definition.

19. The method according to claim 18, wherein the intellectual asset data objects are selected from the group consisting of a patent, a patent application, a trademark, a trademark application, a copyright, a trade secret, a license agreement, and a joint venture agreement.

20. A computer readable media storing thereon instructions for controlling a computer to perform the method according to claim 18.

* * * * *